United States Patent [19]
Takemasa et al.

[11] Patent Number: 5,982,720
[45] Date of Patent: Nov. 9, 1999

[54] DISK REPRODUCING APPARATUS

[75] Inventors: Kaoru Takemasa; Susumu Yoshida; Masami Fujimoto; Toru Suzuki; Kenjiro Ido, all of Kawagoe, Japan

[73] Assignee: Pioneer Electric Corporation, Japan

[21] Appl. No.: 08/991,639

[22] Filed: Dec. 16, 1997

[30] Foreign Application Priority Data

Dec. 27, 1996 [JP] Japan .................................. 8-351688

[51] Int. Cl.$^6$ .................................................. G11B 17/22
[52] U.S. Cl. ............................ 369/36; 369/178; 369/191
[58] Field of Search ................................ 369/34, 36, 38, 369/75.1, 75.2, 77.1, 191, 178, 192

[56] References Cited

U.S. PATENT DOCUMENTS

| | | | |
|---|---|---|---|
| 5,130,959 | 7/1992 | Wakatsuki et al. | 369/77.2 |
| 5,481,514 | 1/1996 | Yamasaki et al. | 369/36 |
| 5,682,364 | 10/1997 | Ogawa | 369/36 |
| 5,808,976 | 9/1998 | Hisatomi | 369/36 |

FOREIGN PATENT DOCUMENTS

| | | |
|---|---|---|
| 3-235249 | of 1991 | Japan . |
| 5-182342 | 7/1993 | Japan . |
| 8-180557 | 7/1996 | Japan . |

Primary Examiner—William J. Klimowicz
Attorney, Agent, or Firm—Evenson, McKeown, Edwards & Lenahan, P.L.L.C.

[57] ABSTRACT

A disk reproducing apparatus with a plurality of disks arrayed and held therein for selecting a desired disk from the arrayed disks and reproducing the disk. The disk reproducing apparatus comprises a disk holding device including therein a plurality of trays holding thereon a plurality of disks arrayed in a direction perpendicular to a main surface of the disk, a disk reproducing device positioned at a non-reproduction position outside the disk holding position where disks held by the disk holding means are located when the disk is not reproduced and positioned at a reproducing position where at least a portion thereof overlaps the disk holding position when the disk is reproduced, a reproducing device carrying mechanism for transferring the disk reproducing device between the non-reproducing position and the reproducing position, a disk selecting device for positioning a disk to be reproduced at a specified position to allow the disk reproducing device to move into the reproducing position when reproducing the disk and for moving aside other disks in the direction of the array of disks, and a disk retrieving and transferring device for taking out and transferring the disk to the reproducing position. When reproducing a disk, an operation for transferring the disk reproducing device from the non-reproducing position to the reproducing position and an operation for transferring the disk from the disk holding position to the reproducing position are executed simultaneously.

16 Claims, 35 Drawing Sheets

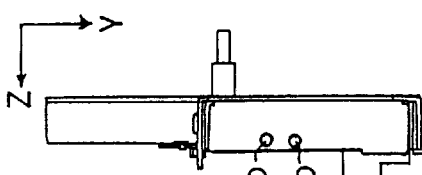
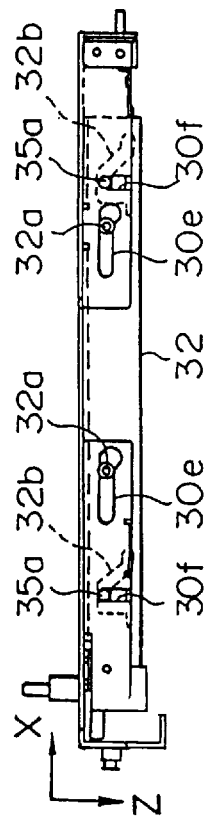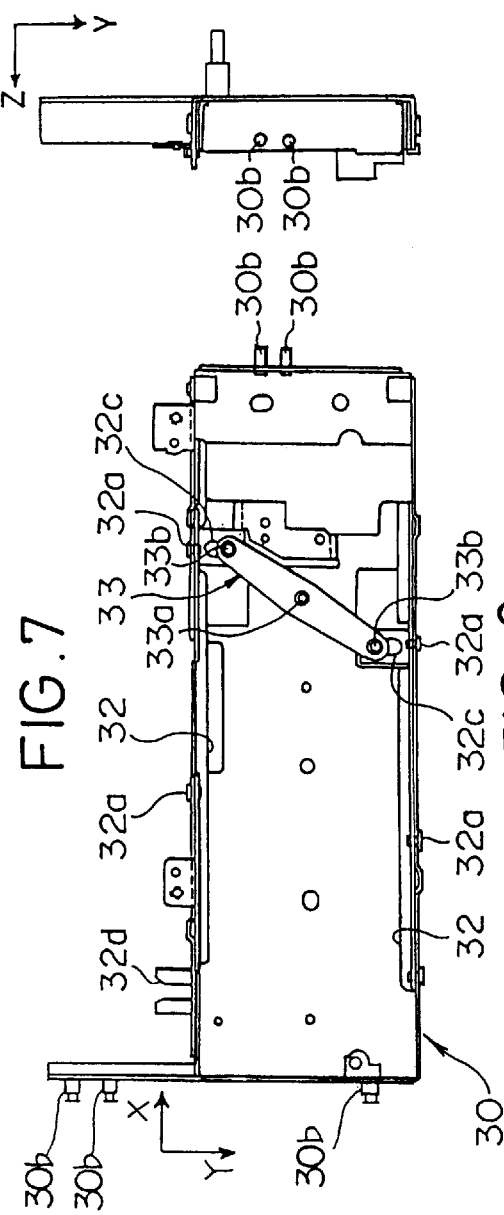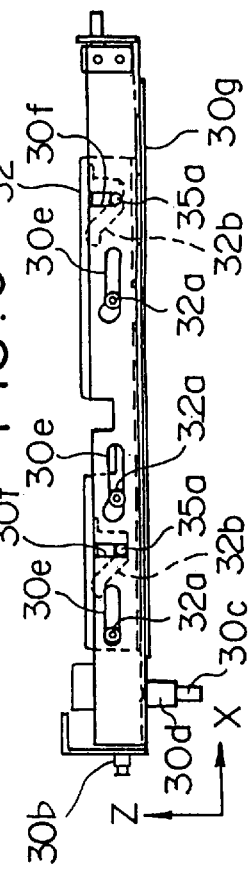
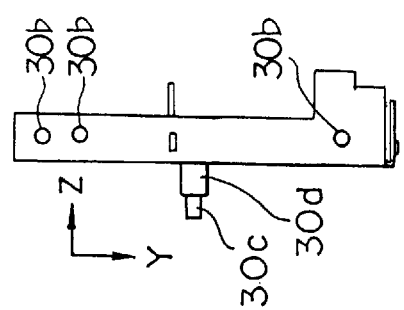

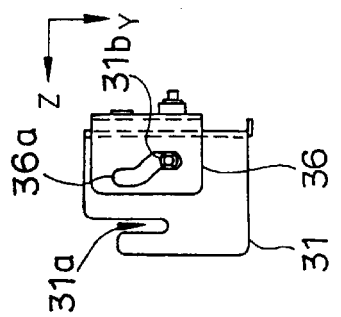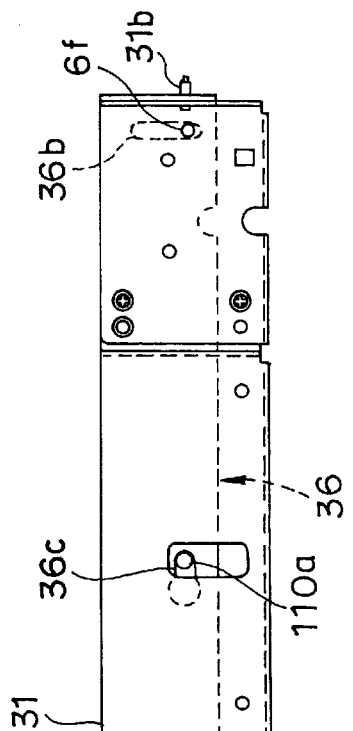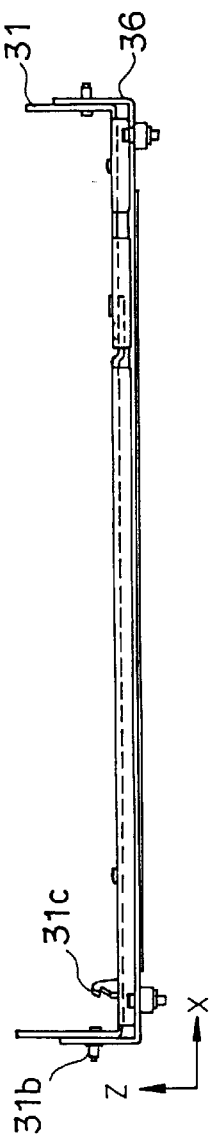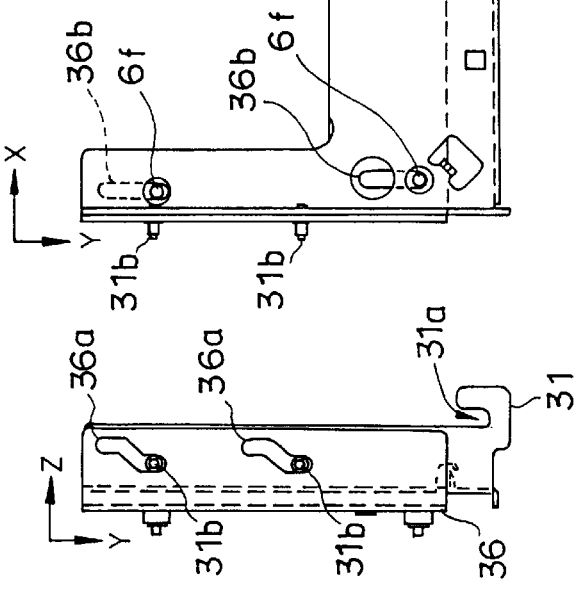

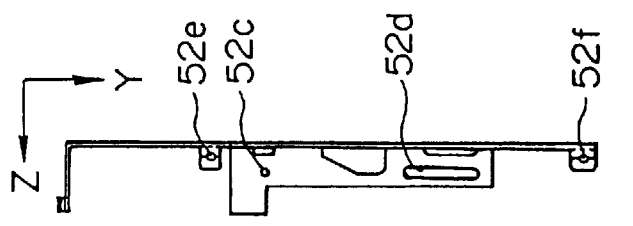
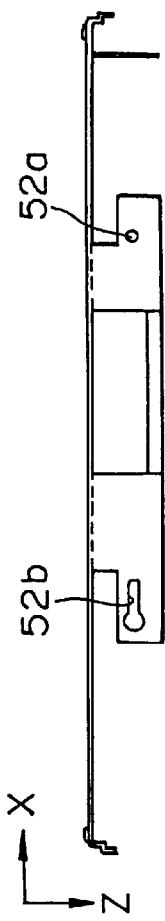
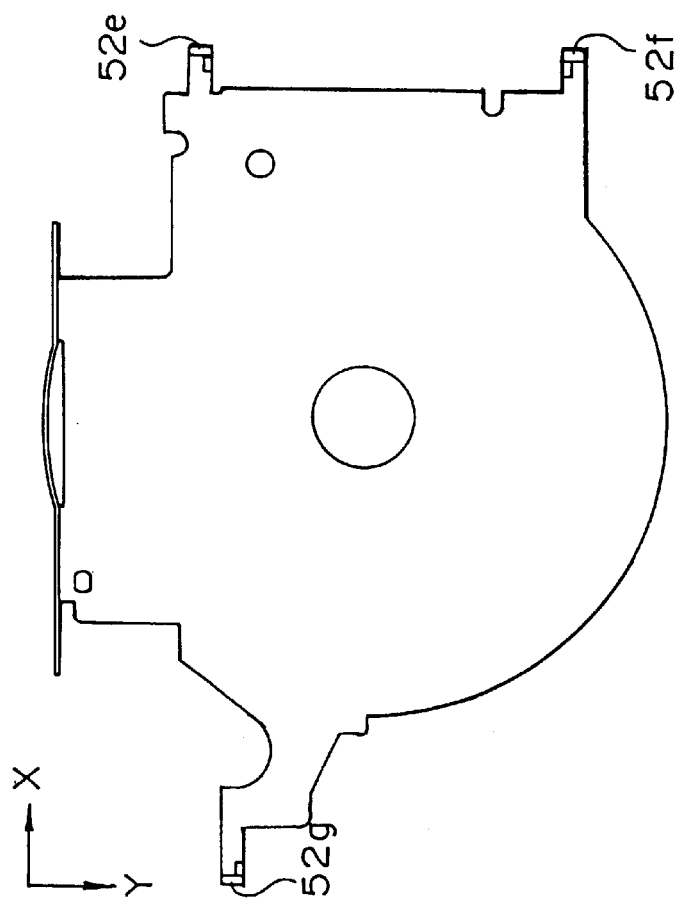
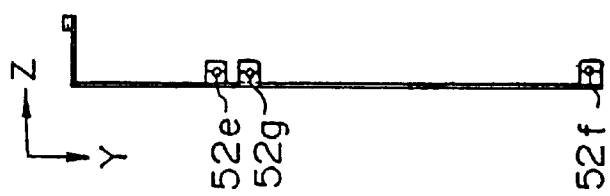

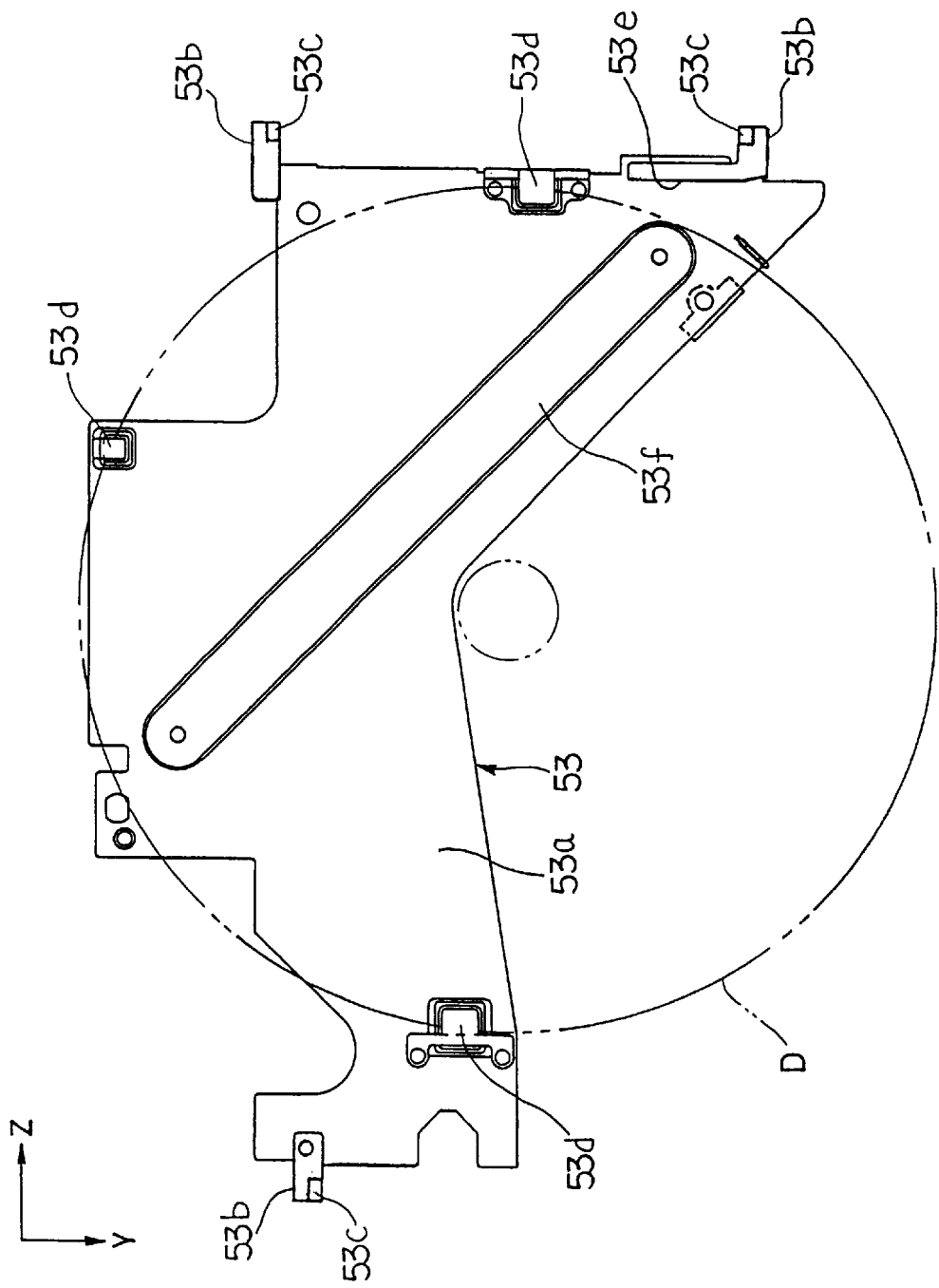

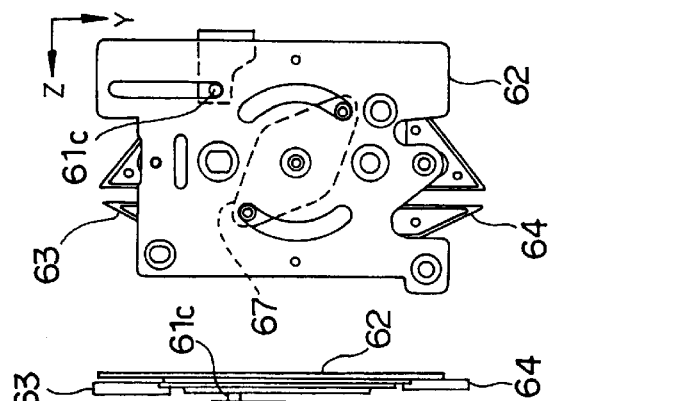
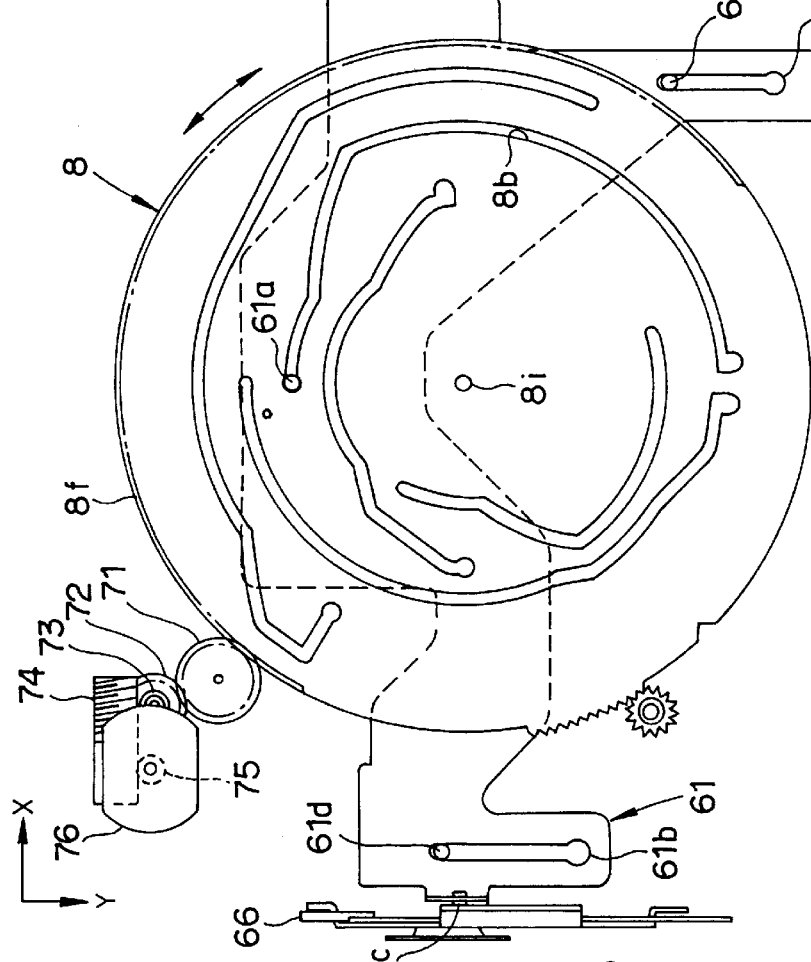
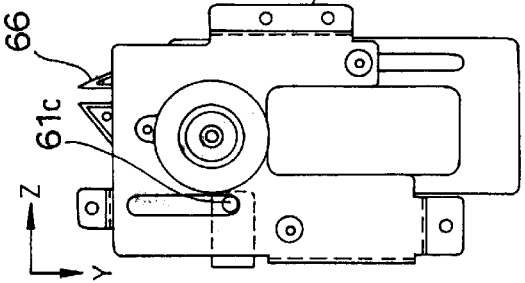

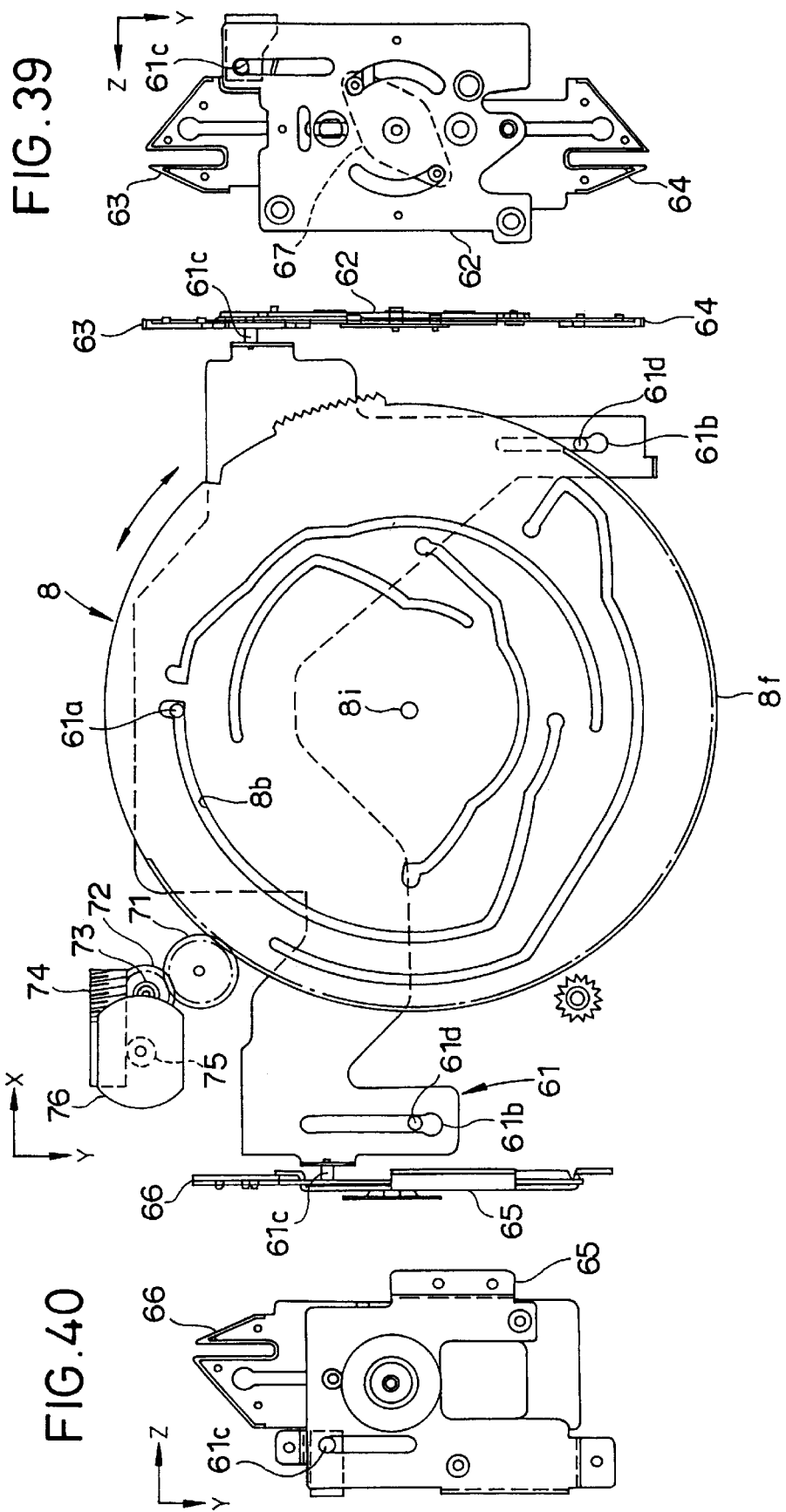

DISK REPRODUCING APPARATUS

BACKGROUND OF THE INVENTION

1. Field of the Invention

The present invention relates to a disk reproducing apparatus which can contain a plurality of information recording disks (referred to simply as disk hereinafter) arrayed in series and can serially reproduce the disks, and more particularly to an on vehicle disk reproducing apparatus installed in a dashboard of a vehicle.

2. Description of Related Art

As a disk player which contains a plurality of disks arrayed in series and allows reproduction of a desired disk any time, there is a known apparatus which uses a magazine or the like containing therein disks separately from a main unit of the player. In this type of player, when a disks is to be reproduced, at first a disk contained in a magazine is protruded in the horizontal direction together with a tray, and a reproducing means including a turn table or the like is moved near to the disk having been moved in the horizontal direction from the underside, and the disk is clamped onto the turn table for reproduction.

Also there is an apparatus in which magazines each containing a disk therein are moved apart in the vertical direction, and a reproducing means is moved into a space between the separated magazine parts for reproducing a disk, as, for instance, the disk player disclosed in Japanese Patent Kokai No. Hei 3-235249.

Furthermore, there is a known disk player in which a plurality of disks are inserted from a disk insertion slot, each disk is transferred by a disk carrier means such as a roller mechanism into a disk storage section, a plurality of disks are contained and arrayed in multiple stages therein, a desired disk is selected from the contained ones, and the selected disk is reproduced. In this type of disk player, when a disk to be reproduced is selected, it is required to move the disk storage section in the direction of disk array, namely in the vertical direction, and to position the desired disk at a specified height against the reproducing means including the turn table or the like. When a disk to be released is selected, it is necessary to move the disk storage section also in the vertical direction and to position the disk to be released at a specified height against the disk carrier means.

However, in the disk players as described above, as relative movement to position a disk against the reproducing means is made by either one, a longer time from generation of an instruction for disk reproduction until execution of reproduction is required as compared to a signal disk player which contains only one sheet of disk.

In a disk player comprising a disk insertion slot, a disk carrier means, and a multiple-stage disk storage section, when a disk to be reproduced is to be selected, it is necessary to enable movement of the disk storage section in a range so as to be capable of selecting all disks contained therein at a position of the reproducing means as a reference. When a disk is to be inserted and also a disk to be discharged is selected, it is required to enable movement of the disk storage section in a range so as to be capable of selecting all the disks contained therein at a position of the disk carrier means as a reference. Accordingly, size of the apparatus inevitably becomes larger in the direction of movement of the disk storage section, for example, in the vertical direction.

OBJECTS AND SUMMARY OF THE INVENTION

The present invention was made in the light of the circumstances as described above, and it is an object of the present invention to provide a disk reproducing apparatus which can reduce a time required from generation of an instruction for disk reproduction until execution of reproduction and carry out smooth reproduction of a disk.

It is another object of the present invention to provide, in addition to achievement of the first object as described above, a disk reproducing apparatus with a main main unit having a smaller size, especially the apparatus which can be minimized by reducing the depth dimension thereof in a direction parallel to a main surface of a disk.

The disk reproducing apparatus according to the present invention comprises a disk holding means for holding a plurality of disks arrayed in a direction perpendicular to a main surface of each of the disks, a disk reproducing means positioned at a not-reproducing position in an outer side from a disk holding position where a disk held by the disk holding means is located when the disk is not reproduced and also transferred to a reproducing position closer to the disk holding position than the not-reproducing position when the disk is reproduced, and a disk retrieving and transferring means for taking out and transferring a desired disk located at the disk holding position to the reproducing position, and when reproducing a disk, an operation for transferring the disk reproducing means from the not-reproducing position to the reproducing position and an operation for transferring the desired disk from the disk holding position to the reproducing position are executed simultaneously.

With these operations, a time required from generation of an instruction for disk reproduction until execution of reproduction can be reduced, which allows smooth reproduction of a disk.

Also, the disk reproducing apparatus according to another aspect of the present invention comprises a disk holding means including therein a plurality of disks arrayed in a direction perpendicular to a main surface of each of the disks, a disk reproducing means positioned at a not-reproducing position in an outer side from a disk holding position where a disk held by the disk holding means is located when the disk is not reproduced and also positioned at a reproducing position where at least a portion thereof lies over the disk holding position than the not-reproducing position when the disk is reproduced, a reproducing means carrier mechanism for transferring the disk reproducing means between the not-reproducing position and the reproducing position, a disk selecting means for positioning a disk to be reproduced at a specified position so that the disk reproducing means can go into the reproducing position when the disk is to be reproduced and also for moving and saving other disks in the direction in which the disks are arrayed, and a disk retrieving and transferring means for taking out and transferring the disk to be reproduced to the reproducing position, and when reproducing a disk, an operation for transferring the disk reproducing means from the not-reproducing position to the reproducing position and an operation for transferring the disk to be reproduced from the disk holding position to the reproducing position are executed simultaneously.

With these features, minimization of the apparatus can be achieved by intensive arrangement of components therein, and at the same time a time required from generation of an instruction for reproduction until execution of reproduction can be reduced, which allows smooth reproduction of a desired disk.

BRIEF DESCRIPTION OF THE DRAWINGS

FIG. 4 is a plan view, while FIG. 5 is a front view thereof;

FIGS. 6 to 10 are views each showing a carriage 30 according to the present invention, and FIG. 7 is a plan view, FIG. 6 is a front view, FIG. 8 is a rear view, while FIG. 9 and FIG. 10 are side views thereof respectively;

FIG. 12 is a plan view, FIG. 11 is a front view, FIG. 13 is a rear view, while FIG. 14 and FIG. 15 are side views thereof respectively;

FIGS. 16 to 19 are views each showing a carriage holding frame according to the present invention, and FIG. 16 is a plan view, FIG. 17 is a front view, while FIG. 18 and FIG. 19 are side views thereof respectively;

FIG. 25 is a rear view, while FIG. 26 is a right side view thereof respectively;

FIGS. 27 to 30 are views each showing a lower holder according to the present invention, and FIG. 28 is a plan view, FIG. 29 and FIG. 30 are side views, while FIG. 27 is a rear view thereof;

FIG. 31 is a plan view of a tray according to the present invention;

FIG. 34 is a plan view, while FIG. 33 is a rear view thereof;

FIGS. 35 to 37 are views each showing a state before a tray separating means according to the present invention operates, and FIG. 35 is a plan view, while FIG. 36 and FIG. 37 are side views thereof;

FIGS. 38 to 40 are views each showing a state after the tray separating means according to the present invention operates, and FIG. 38 is a plan view, while FIG. 39 and FIG. 40 are side views thereof respectively;

FIG. 41 is a right side view, while FIG. 42 is a left side view thereof respectively;

DETAILED DESCRIPTION OF PREFERRED EMBODIMENTS

Detailed description is made for embodiments of the disk reproducing apparatus according to the present invention with reference to the attached drawings.

An outer frame of the disk reproducing apparatus according to the present invention comprises a housing 1 which is to be inserted through a port for installation formed on a dashboard (not shown in the figures) of a car and fixed to a bracket or the like to hold it. A front panel 2 of the housing 1 is exposed to the room of the car.

Figure 1:
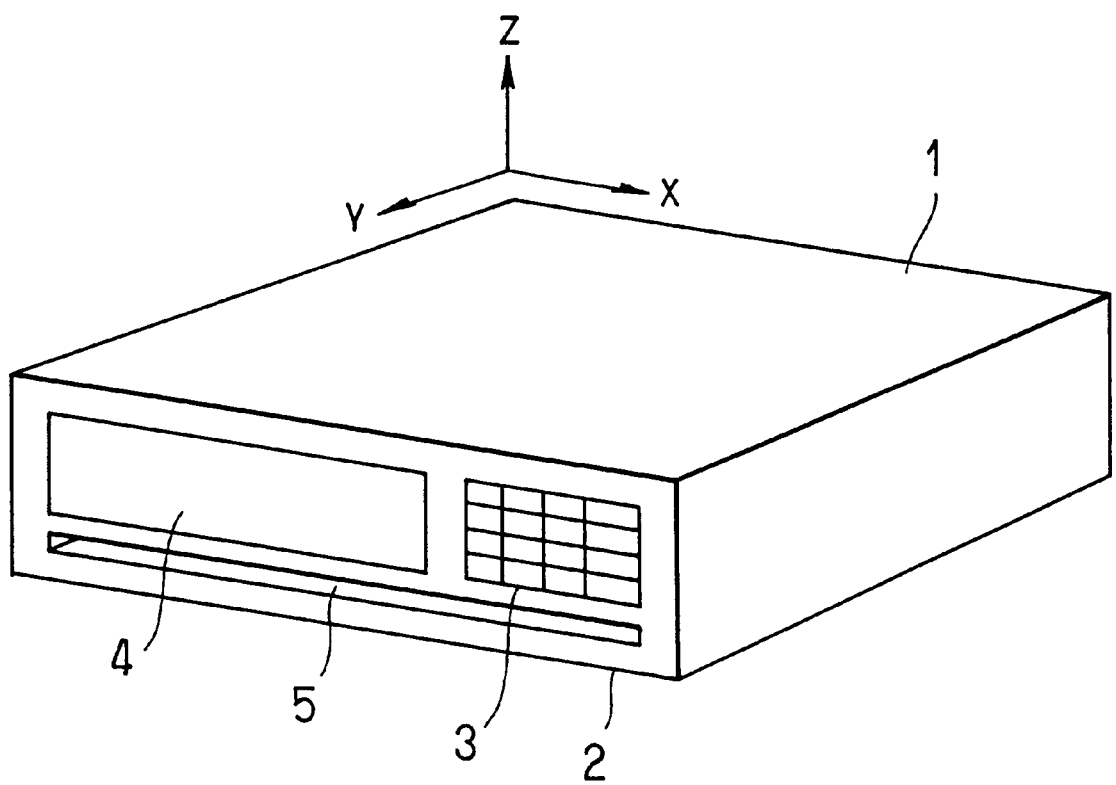
FIG. 1 is a perspective view showing an appearance of a disk reproducing apparatus according to the present invention.

As shown in FIG. 1, provided on the front panel 2 forming the front section of the housing 1 are a control panel section 3 for controlling generation of an instruction for disk reproduction or some other instructions and a display section 4 each in the upper side thereof. A and a linear disk insertion slot 5 for inserting therethrough a disk to be reproduced is formed in the lower section of the front panel 2, and is closed when a disk is not reproduced, by a closing cover (not shown in the figure) that is fixed thereto so as to be capable of swinging or sliding. Provided in the housing 1 is a main chassis 6 through rubber cushions 1a (Refer to FIG. 2) as a vibration insulating mechanism, and various types of mechanism are arranged on this main chassis.

Figure 2:
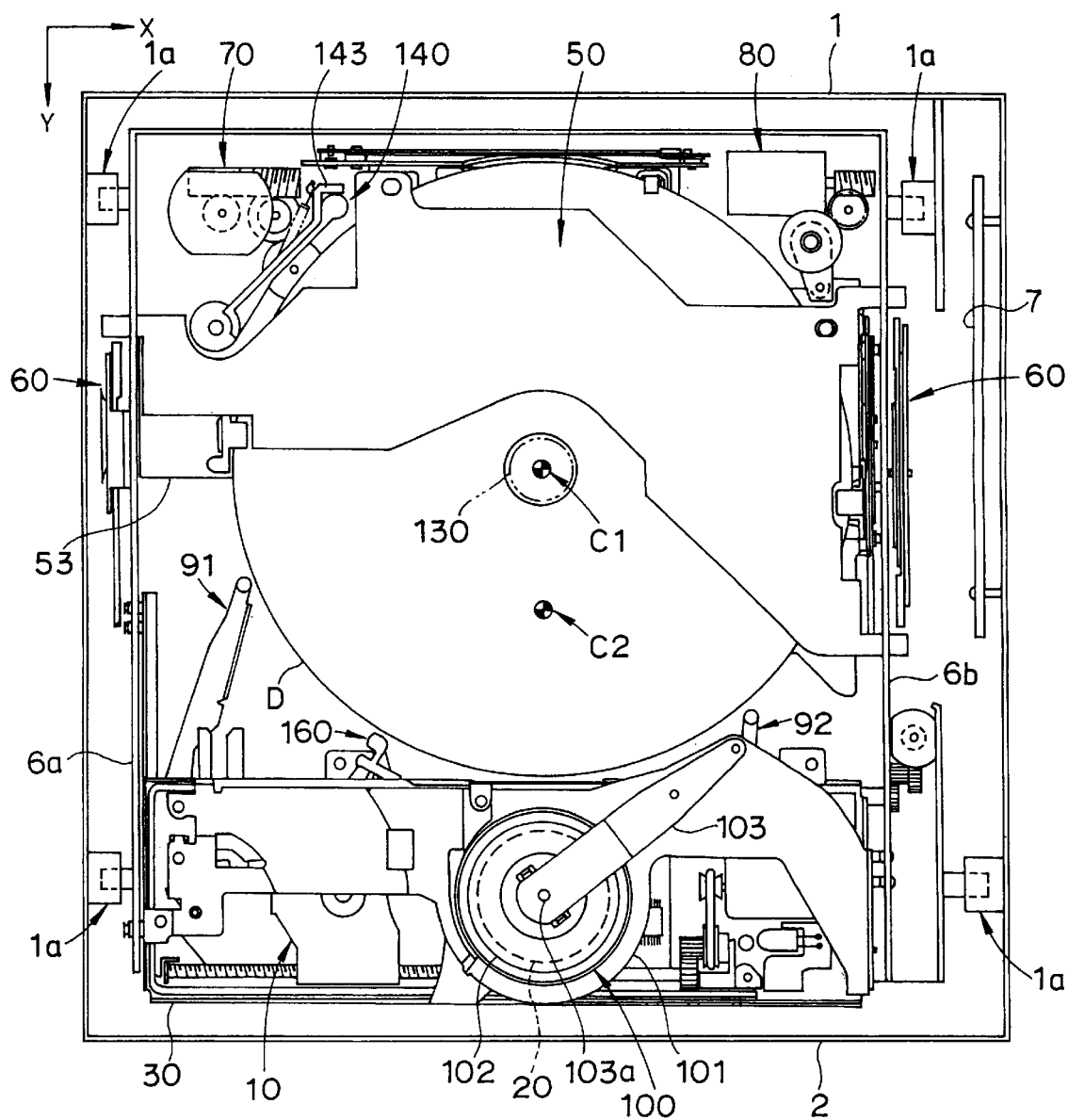
FIG. 2 is a plan view showing a positional relation of components in the disk reproducing apparatus according to the present invention.

As shown in FIG. 2, a carriage 30 for holding the reproducing means comprising a pickup 10 and a turn table 20 each required for reproducing a disk is provided on the main chassis 6 and is movable in the longitudinal direction (direction of Y-axis) so that the carriage 30 is positioned substantially at the center (C2) of the apparatus at the time of reproduction and is positioned in the front side at the time of non-reproduction. Provided in a region in the depth (rear side) of the main chassis 6 is a disk holding means 50 including trays 53 or the like for holding a plurality of disks (four disks in the embodiment) arrayed in the vertical direction (direction of Z-axis), and this disk holding means 50 is designed to move in the vertical direction (direction of Z-axis) by a moving-up/down mechanism or the like having a pantograph mechanism. A tray separating means 60 constituting a part of a disk selecting means for selecting a desired disk to be reproduced and separating the disk from other disks is provided along side faces 6a, 6b of the main chassis 6 and is movable along the side faces in the longitudinal direction (direction of Y-axis). Further, a printed circuit board 7 with a control circuit or the like of the apparatus formed thereon is provided in the outer side from one side 6b of the main chassis in parallel to the side face thereof and is fixed onto the internal wall of the housing 1.

Figure 3:
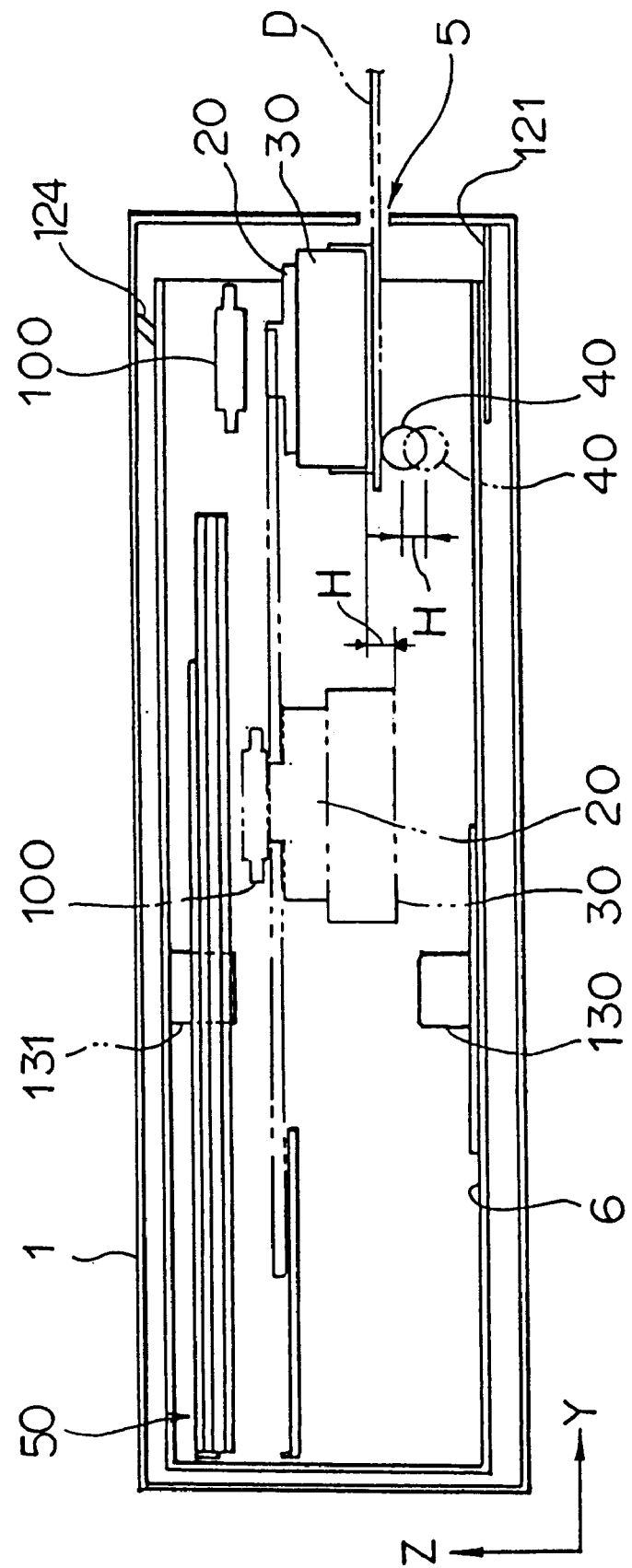
FIG. 3 is a side view showing a positional relation of components in the disk reproducing apparatus according to the present invention.

Also, as shown in FIG. 3, a roller 40 constituting a part of the disk carrier means is provided in the lower side of the carriage located at a not-reproducing position and extends in the lateral direction (direction of X-axis). It should be noted that each solid line used for illustrating the carriage 30, turn table 20 and clamping means 100 indicates a state in which each of the components is located at each retreat position (non-reproduction position), and each phantom line indicates a state in which each of the components is located at a reproducing position.

Detailed description is made hereinafter for the various types of mechanism. At first, description is made for the disk carrier means for transferring a disk inserted through the disk insertion slot 5 of the housing 1 as far as a disk storing position, namely the trays 53 provided inside the housing and transferring the disk back to the disk insertion slot from the disk storing position when the disk is to be ejected.

Figure 4:
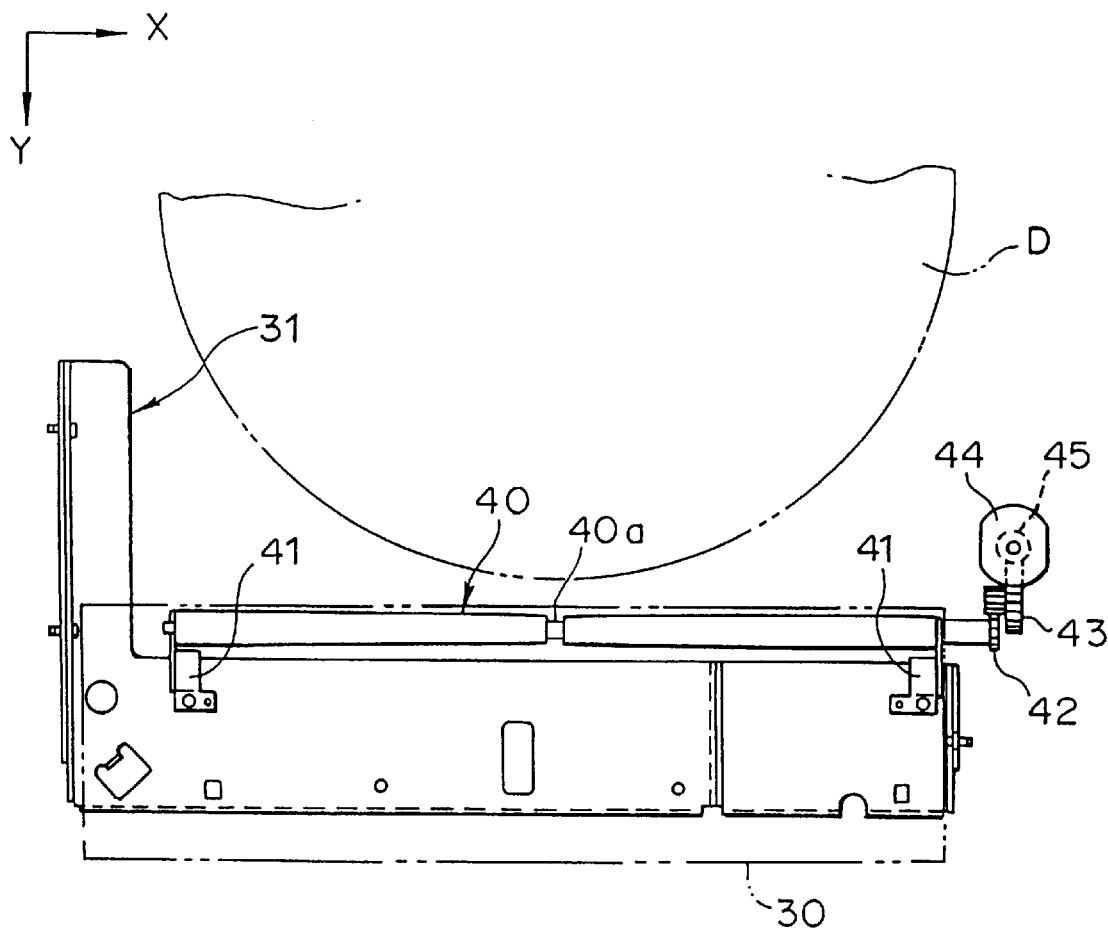
FIG. 4 and FIG. 5 are views each showing a disk carrier means according to the present invention.
Figure 5:
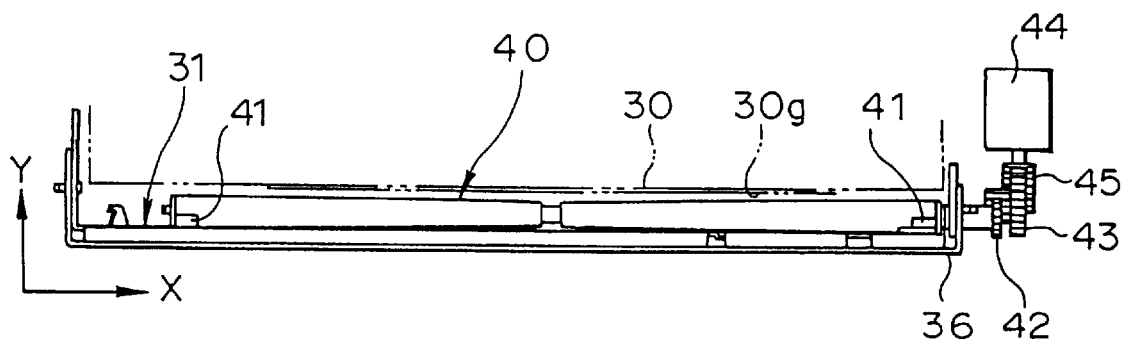
Figure 11:
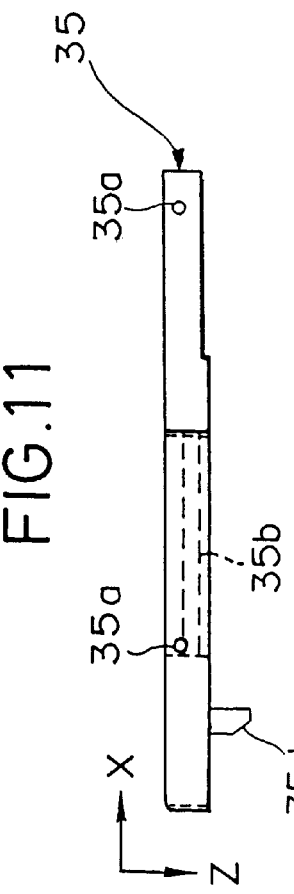
FIGS. 11 to 15 are views each showing a reproducing means holding frame according to the present invention.
Figure 12:
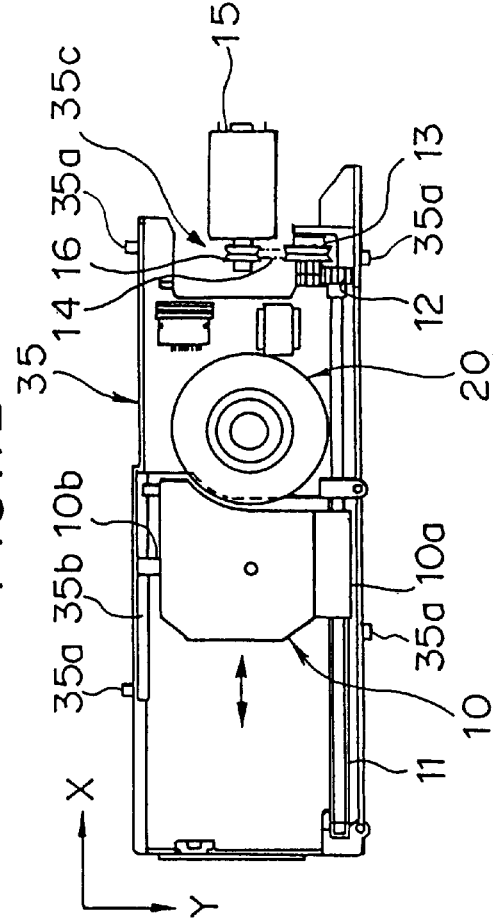
Figure 13:
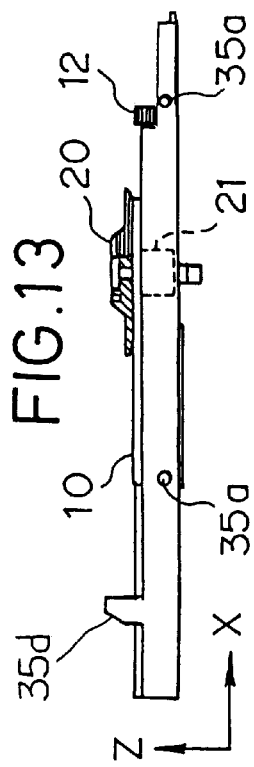
Figure 14:
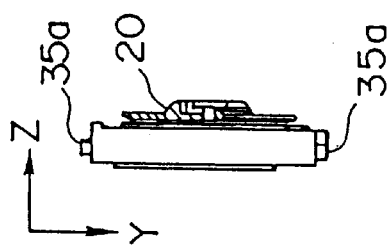
Figure 15:
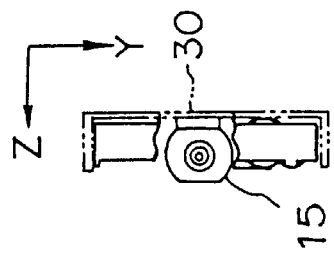

As shown in FIG. 4 and FIG. 5, a pair of cantilever-formed plate springs 41 are screwed to positions adjacent to both edges of the top surface of a substantially L-shaped carriage holding frame 31, and a shaft 40a of the roller 40 is rotatably supported by bearing holes formed at free edges of the plate springs 41 respectively. The roller 40 is fitted with a shrouded member made of resin and having a tapered shape so that the outer diameter of the roller to the shaft 40a increases from the center of the shaft toward both edges thereof. A gear 42 is fixed to one edge of the shaft 40a, and this gear 42 engages a worm 45 fixed to a motor 44 as a driving power via an intermediate gear 13 provided on the side face 6b of the main chassis 6. A rear section of a bottom face of the carriage 30 positioned in an outer side from the region where arrayed and held disks D are located is positioned in the upper side of the roller 40 when a disk is not reproduced (or reproduction is stopped), and the carriage 30 and the roller 40 are positioned so that the carriage lies over the roller in the direction in which disks are arrayed when a disk is not reproduced. With this arrangement of the carriage and roller as described above, the depth dimensions of the apparatus can be reduced, which allows the apparatus to be minimized. Further, a smoothing film 30g made of resin is adhered to the bottom face of the carriage. Accordingly, in the non-reproduction state, a space is formed between the roller 40 and the smoothing film 30g so that the space is the largest at the central section thereof in the lateral direction (direction of X-axis) and is getting narrower toward both edges of the carriage. In the construction as described above, when the roller 40 is rotated by the motor 44, a disk inserted through the disk insertion slot 5 is transferred toward an internal side of the housing with the peripheral region of the disk held by the roller 40 and the smoothing film 30g. When the roller 40 is reversely rotated, the disk is transferred back to the disk insertion slot. In this step, the space is formed with a shape like a wedge in which both of the edges are narrow, so that the disk is transferred to a specified disk storing position while a force toward the center of the roller namely self-centering of a disk is acted, and conversely, the disk can surely be transferred back toward the center of the disk insertion slot 5.

The disk carrier means for transferring a disk to the internally provided disk storing position (trays) and transferring the disk back to the disk insertion slot from the storing position when the disk is to be ejected comprises the roller 40 and the smoothing film 30g.

Also the driving means for driving the disk carrier means comprises the gear 42, intermediate gear 43, worm 45, and the motor 44.

Next description is made for the carriage 30 for holding the pickup 10 and the turn table 20 each required for reproducing a disk or the like and a carriage moving up/down means for reciprocating the carriage 30 in the vertical direction (direction of Z-axis).

As shown in FIG. 6 to FIG. 10, the carriage 30 having a substantially rectangular form when viewed from the top has a box shape with a top surface thereof open, and accommodates the reproducing means holding frame 35 comprising the pickup 10 and the turn table 20 or the like each described later in the internal space of the box. One side of the carriage 30 has three guide pins 30b planted and provided thereon and projecting in the horizontal direction, while the other side thereof opposite to the side described above has also two guide pins planted and provided thereon and projecting in the horizontal direction, and those three and two guide pins 30b penetrate linear guide holes 6c (Refer to FIGS. 20 and 21) formed on the side walls 6a and 6b of the chassis 6 and extend in the longitudinal directions respectively.

An engaging pin 30c engaged in a long hole 37c of a swing arm 37 for driving the carriage described later is provided on one side of the bottom face of the carriage 30 so that it projects downward, and a rotatable rolling ring 30d is fitted around the outer periphery of this engaging pin 30c.

Formed on side walls in the front and back sides of the carriage 30 are, as shown in FIGS. 6 and 7, two units of guiding long hole 30e extending in the horizontal direction and two units of vertically long hole 30f each with an upper edge thereof open respectively. Further, slide plates 32 are provided along the internal sides of the side walls thereof, and pins 32a planted and provided on these slide plates 32 are slidably inserted in and engaged in the guiding long holes 30e respectively. Cam holes 32b each reversely acting are also formed on the slide plates 32 respectively, and pins 35a (Refer to FIGS. 11 to 15) projecting from the reproducing means holding frame 35 penetrate the cam holes. The pins 35a also penetrate the vertically long holes 30f and is movable in the vertical direction.

The slide plates 32 provided in the front and rear sides thereof are correlated to each other, by a coupling link 33 provided and rotatable around a supporting shaft 33a provided in the bottom face of the carriage, so that both of the plates move in the direction opposite to each other in the lateral direction (direction of X-axis) respectively. It should be noted that, in coupling sections, pins 33b of the coupling link 33 are inserted and engaged in engaging holes 32c of the slide plates 32 respectively. Accordingly, when a force in the lateral direction is exerted on a U-shaped engaging piece 32d provided in one edge side of the rear side slide plate 32, the front and the rear slide plates 32 slide in the opposite directions to each other respectively, for example, when the engaging piece 32d is moved in the direction opposite to the direction of X-axis, the pin 35a penetrating the cam hole 32b, namely the reproducing means holding frame 35 is pushed upward along the vertically long hole 30f. Conversely, when the engaging piece 32d is moved in the direction of X-axis, the pin 35a namely the reproducing means holding frame 35 is moved downward.

As shown in FIGS. 11 to 15, the reproducing means holding frame 35 holds and supports components such as the pickup 10 for picking up information recorded on a disk, turn table 20 for supporting and rotating the disk, a spindle motor 21 as a driving power, and a feed screw 11 for moving the pickup 10 in the lateral direction (direction of X-axis) namely in the direction parallel to the recorded surface (main surface) of the disk. A female threaded member 10a projecting from and provided on the front edge side of the pickup 10 engages the feed screw 11, while the engaging piece 10b projecting from and provided on the rear edge thereof is slidably supported by a guiding groove 35b formed on the wall in the rear side of the holding frame 35. The feed screw 11 is also rotatably supported by the holding frame 35, and a gear 12 is fixed to one edge of the screw. This gear 12 engages teeth of a gear with a pulley 13 also rotatably supported by the holding frame 35. The teeth section of this gear with a pulley 13 is formed by two pieces of gear to have a scissors-gear construction to eliminate backlash. A motor 15 as a driving power is fixed to a bottom surface of the carriage 30, and a pulley 16 fixed to the spindle of this motor 15 and a pulley of the gear with a pulley 13 are coupled to each other by a rubber belt 14 through a notched section 35c of the holding frame 35. As described above, a heavily-weighted substance such as the motor 15 is fixed to the carriage 30, so that the weight thereof to be moved up/down together with the reproducing means holding frame 35 can be reduced, which allows the load on the driving power to be reduced. With this construction, reciprocal movements of the pickup 10 is executed by rotating the motor 15. Namely the pickup driving means for moving the pickup 10 in the radial direction along the recorded surface of the disk comprises the motor 15, pulley 16, rubber belt 14, gear 13 with a pulley, gear 12, feed screw 11, and female screw 10a.

The carriage holding frame 31 having a substantially L-shape when viewed from the top is located in the lower side of the carriage 30 as shown in FIGS. 16 to 19, and cam plates 36 also forming an L-shape are located in the lower part of this carriage holding frame 31. Provided at upper edges in both sides of the carriage holding frame 31 are U-shaped engaging grooves 31a each opening to the rear side, and the guide pins 30b engage in the engaging grooves 31a when the carriage 30 is located at a stand-by position.

Accordingly, a relative movement of the carriage 30 and the carriage holding frame 31 is restricted in the vertical direction (direction of Z-axis) when the carriage 30 is at the standby position, while, in the longitudinal direction (direction of Y-axis), a relative movement thereof, namely the reciprocal movements of the carriage 30 can be performed.

Figure 20:
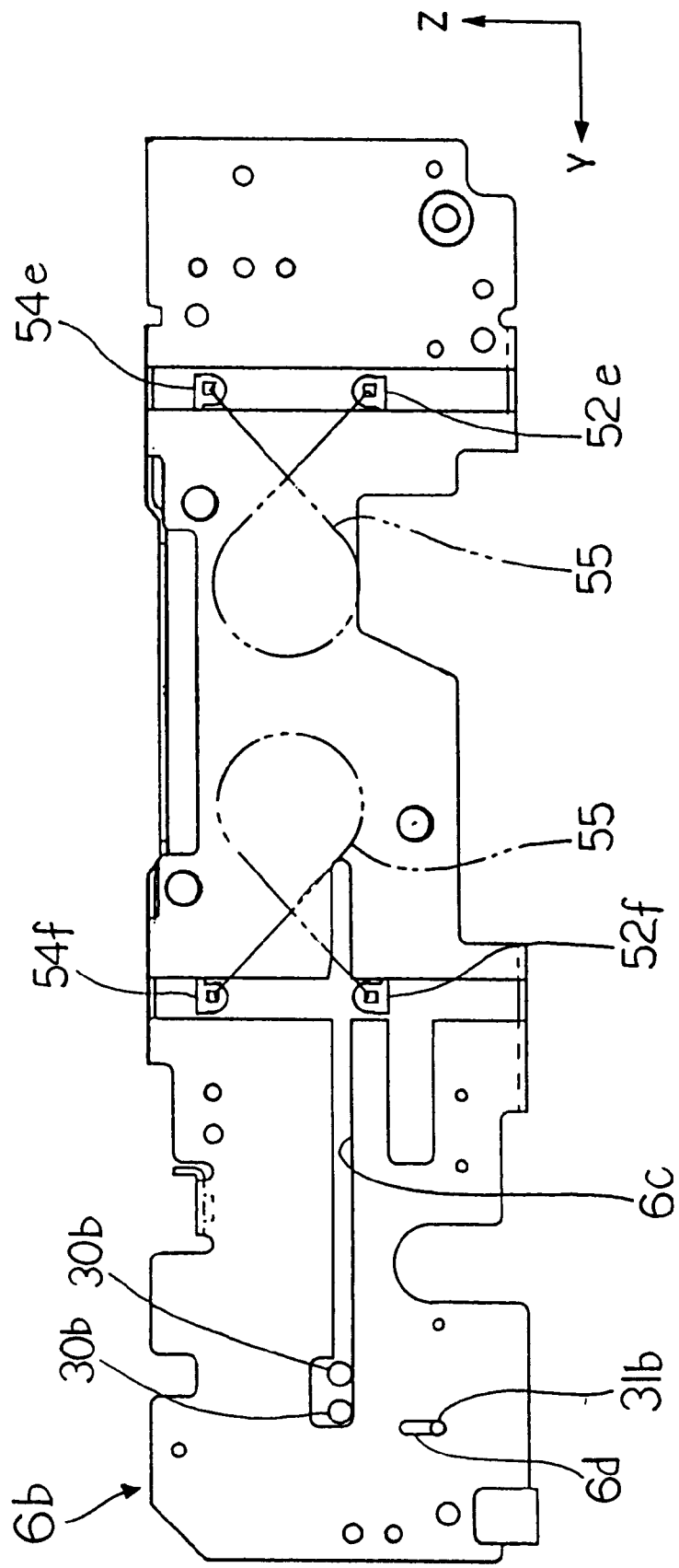
FIG. 20 is a right side view of a main chassis according to the present invention.
Figure 21:
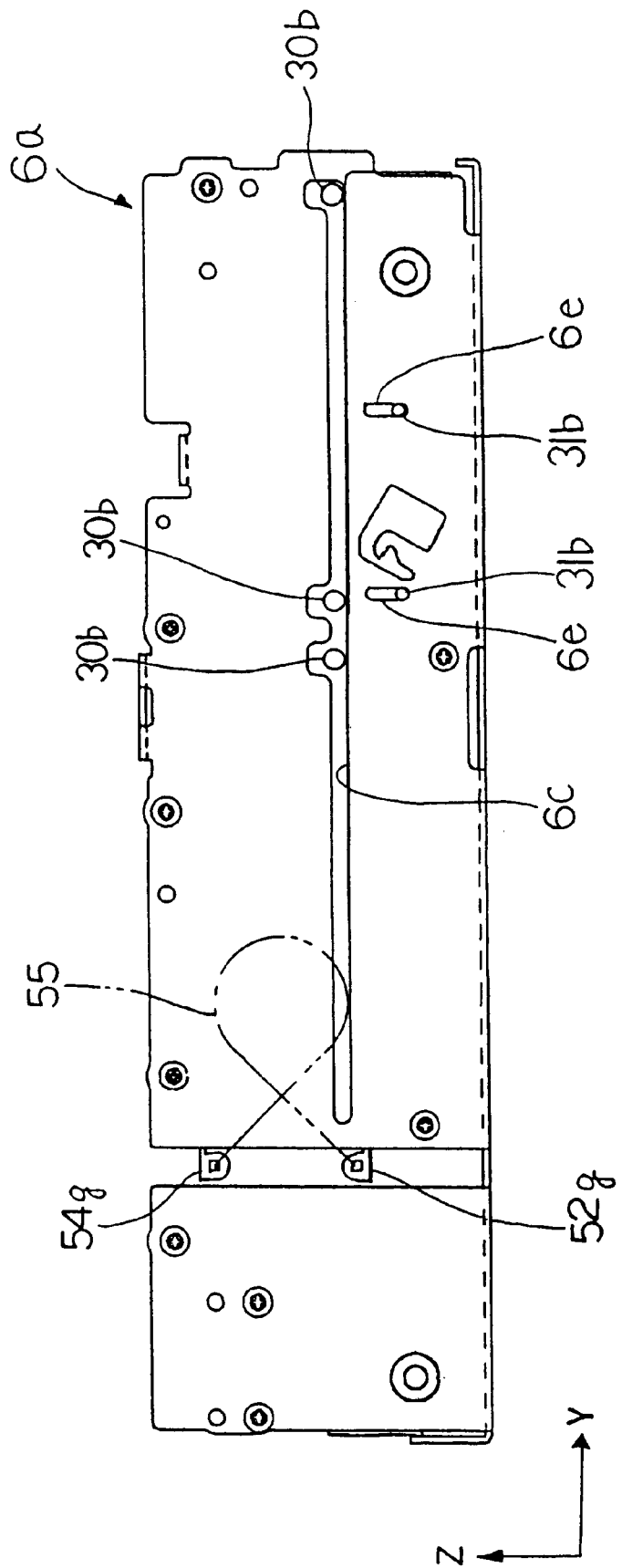
FIG. 21 is a left side view of the main chassis according to the present invention.

Two pieces of pin 31b are provided on one of the side walls of the carriage holding frame 31 and one piece of pin 31b is provided on the other side wall each by projecting therefrom in the horizontal direction, and the bottom face sections of those pins 31b are positioned in the lower part of the carriage holding frame 31 and the pins on the side walls thereof are inserted in the cam holes 36a of the cam plates 36 positioned in the outer side from the side walls of the carriage holding frame 31 respectively. These pins 31b are further inserted, as shown in FIG. 20 and FIG. 21, into the vertically long holes 6e and 6d formed on the side walls 6a and 6b of the main chassis 6 so as to be movable only in the vertical direction.

Accordingly, the cam plates 36 are moved in the longitudinal direction (direction of Y-axis), whereby the carriage holding frame 31 is moved in the vertical direction (direction of Z-axis).

It should be noted that, the cam plates 36 are inserted by pins 6f planted and provided on the bottom face of the main chassis 6 into the guiding long holes 36b of the cam plates supported by the main chassis so as to be capable of reciprocating in the longitudinal direction, and an engaging pin 110a of a driving lever 110 for moving up/down a carriage located in the outer side from the bottom face of the main chassis 6 is engaged in an engaging hole 36c (Refer to FIG. 16).

Figure 22:
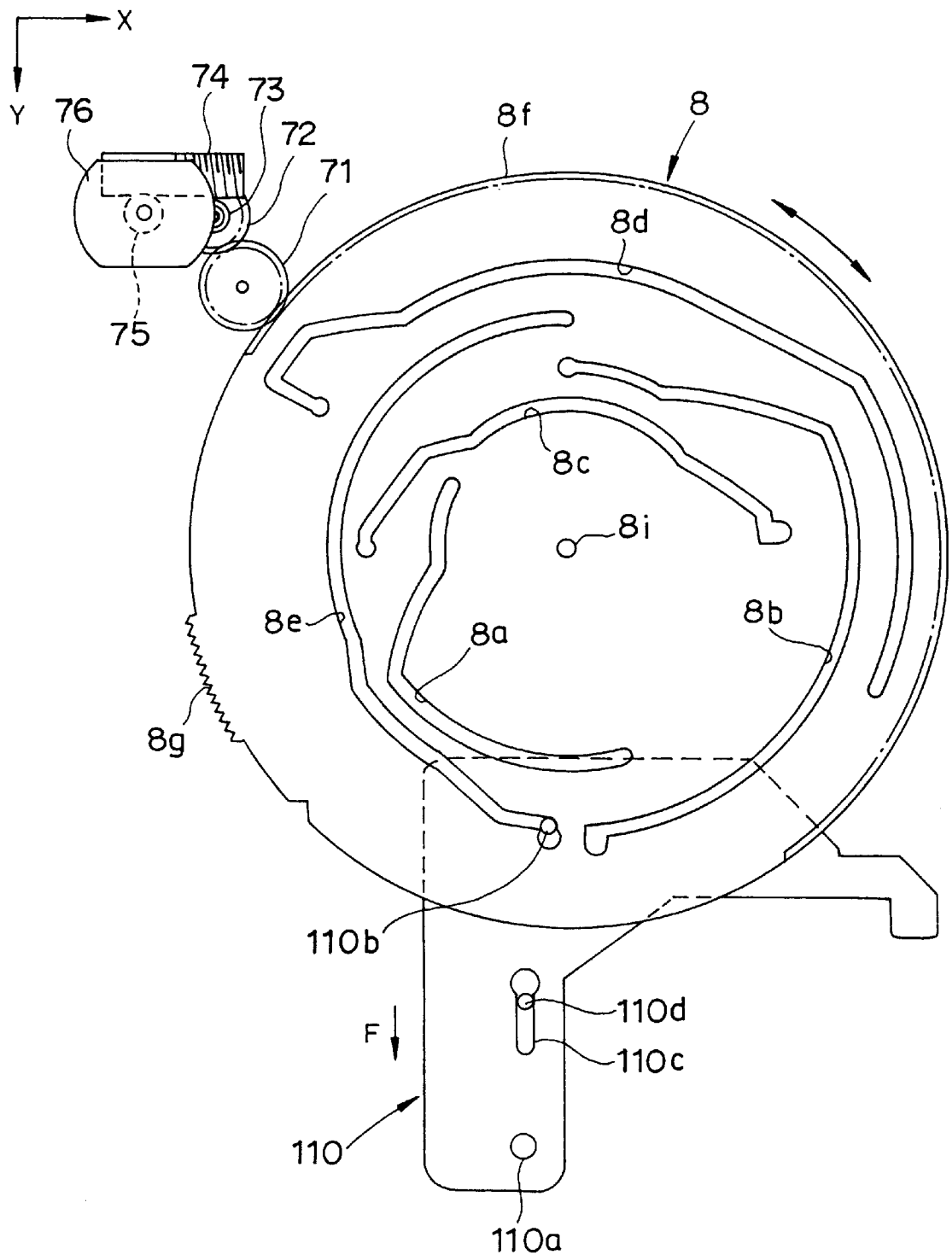
FIG. 22 is a plan view showing a driving lever for moving up and down the carriage according to the present invention.

Namely, as shown in FIG. 22, a cam gear 8 is provided on the top surface of the main chassis 6 and is rotatable around a supporting shaft 8i, while the driving lever 110 for moving up/down a carriage is provided on the bottom surface of the main chassis 6, and this driving lever 110 is inserted by a guide pin 110d planted and provided on the main chassis into the guiding long hole 110c thereof so as to be capable of reciprocating in the longitudinal direction (direction of Y-axis). Also, an engaging pin 110b planted and provided on the driving lever 110 is inserted and engaged in a cam groove 8e formed on the cam gear 8, so that this engaging pin 110b moves along the cam groove 8e.

Accordingly, when the cam gear 8 is rotated in the clockwise direction by driving means 71, 72, 73, 74, 75, and 76 each described later, the driving lever 110 is moved forward (F direction) by means of the cam action of the cam groove 8e engaged by the engaging pin 110b. Also, the engaging pin 110a is engaged in an engaging hole 36c of the cam plate 36, so that the cam plate 36 moves forward in correlation to the movement of the driving lever 110. The engaging pins 31b of the carriage holding frame 31 are held up by means of the cam action of the cam grooves 36a, and the carriage 30 is moved upward to a specified height together with the carriage holding frame 31. When the cam gear 8 is rotated in the counterclockwise direction from the state described above, the carriage 30 is moved downward to a specified height in a sequence reverse to that described above.

The carriage moving up/down means, for moving the carriage 30 upward as far as the specified height (a position where a disk can be inserted) when a disk is not reproduced and for moving the disk downward as far as the specified height (a position where a disk can not be inserted) when a disk is reproduced (Refer to FIG. 3), comprises the cam plates 36, carriage holding frame 31, and the driving lever 110 or the like.

As described above, by moving upward the disk carrier means comprising the carriage 30 and roller 40 when a disk is not reproduced, especially when a disk is stored in and retrieved from a storage section in the apparatus, a disk can be stored in and retrieved therefrom by moving the disk storage section (disk holding section) with a plurality of disks arrayed in the vertical direction by a stroke as shortest as possible, which allows the thickness of the apparatus to be smaller, namely the apparatus itself to be minimized. Similarly, when two positions for a reproducing position are set in a upper side as well as a lower side, further minimization of the apparatus can be expected.

Next description is made for a carriage carrier means for transferring a carriage (namely a reproducing means) between a standby position and a reproducing position.

Figure 23:
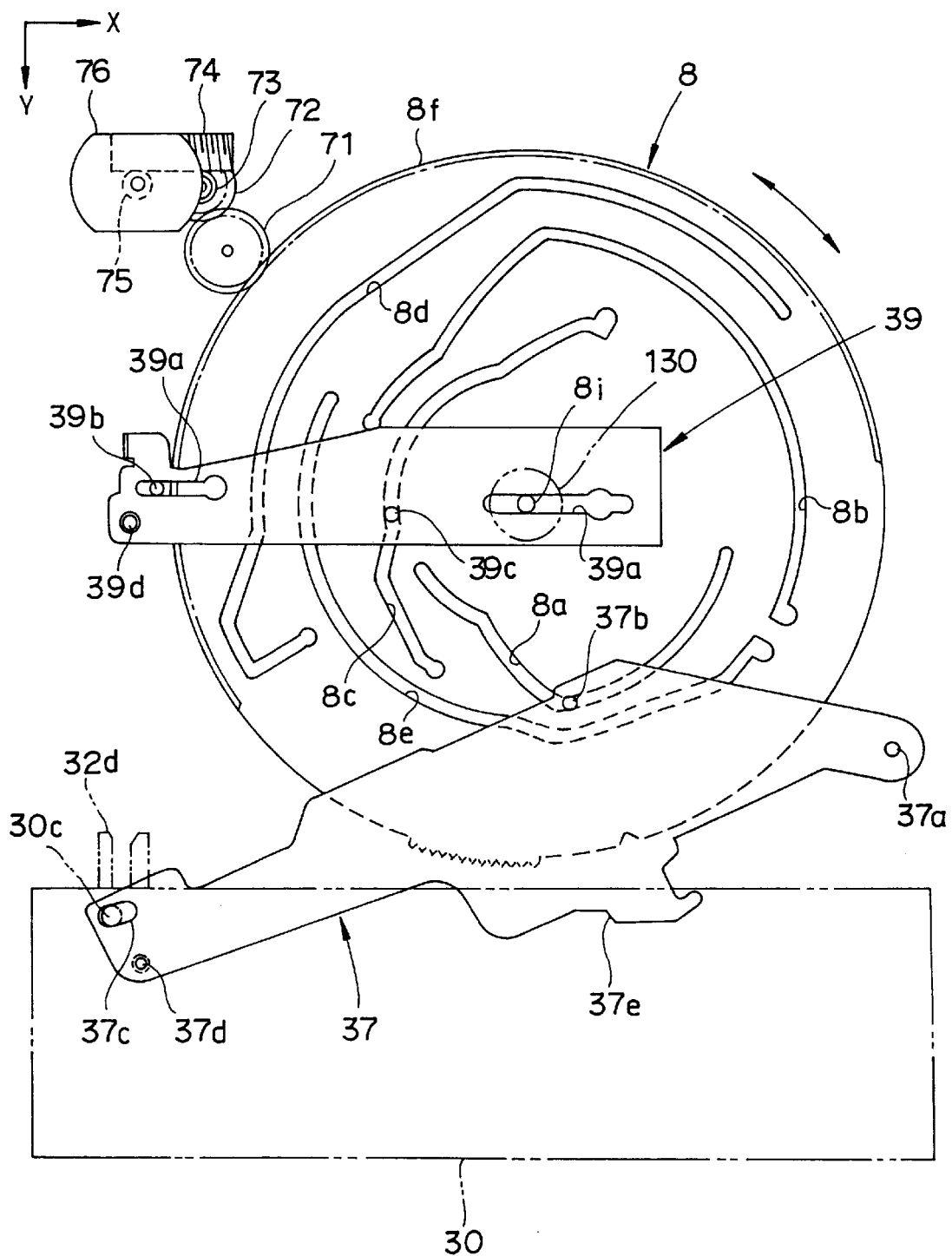
FIG. 23 is a plan view showing a carriage carrier means according to the present invention.

As shown in FIG. 23, the disk-shaped cam gear 8 is fixed on the top surface of the main chassis and is movable around the central shaft 8i, and this cam gear 8 has a first cam groove 8a for transferring a carriage, a second cam groove 8b for separating a tray from others, a third cam groove 8c for moving up and down a disk reproducing means, a fourth cam groove 8d for taking out a disk, and a fifth cam groove 8e for moving up and down a carriage each formed thereon.

Also, the cam gear has teeth 8f and 8g formed on portions of the periphery thereof and is rotated by a motor 76 through a gear array such as a gear 71 engaging the teeth 8f, double gears 72, 73, a gear with a worm 74, and a worm 75 engaged and fixed to the spindle. A swing arm 37 for driving a carriage is provided in the front side and upper side of the cam gear 8 so as to be capable of swinging around a supporting shaft 37a fixed to the main chassis 6. This swing arm 37 has an engaging pin 37b projecting downward from a substantially middle section of the arm that is engaged in the first cam groove 8a of the cam gear 8 and is movable along the cam groove, and also a guide pin 37d projecting downward and engaging in a guiding groove (not shown in the figure) formed on the main chassis 6 is provided in the edge of a swing section thereof, and the long hole 37c in which the engaging pin 30c projecting downward from the bottom face of the carriage 30 is slidably inserted and engaged is also formed in the edge thereof.

Figure 24:
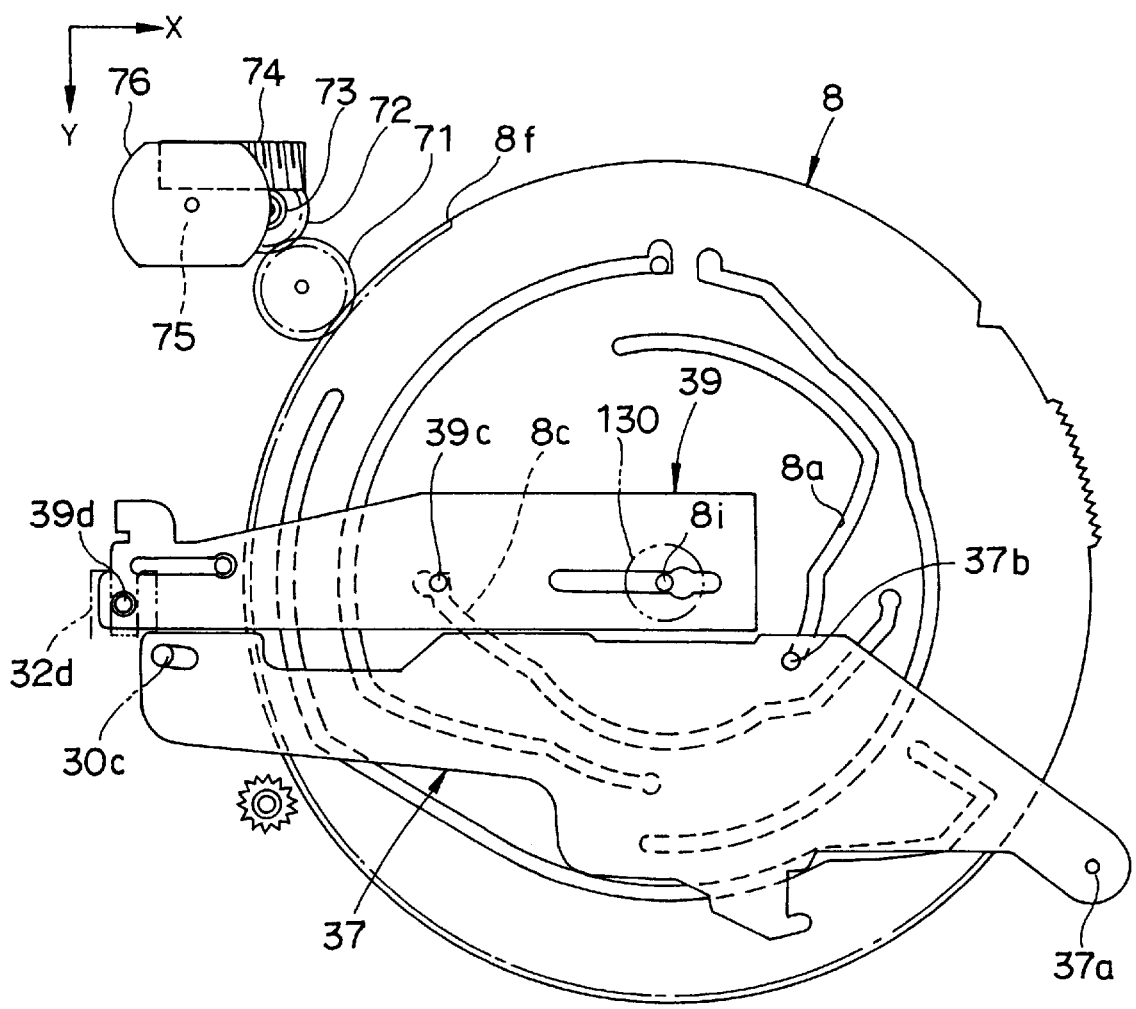
FIG. 24 is a plan view showing a carriage carrier means according to the present invention.

Accordingly, when the cam gear 8 is rotated by a predetermined angle from the stand-by position shown in FIG. 23 in the counterclockwise direction, the swing arm 37 is swung rearward (in the direction opposite to the direction of Y-axis) according to the cam action of the first cam groove 8a to reach the reproducing position as shown in FIG. 24. In this step, the carriage 30 is correlated, as the engaging pin 30c thereof is engaged in the long hole 37c, to the movement of the swing arm 37, and is transferred to the reproducing position with the guide pins 30b of the carriage moving along the guiding holes 6c provided on the side faces 6a, 6b of the main chassis. This reproducing position is located in the front side than the center of a disk stored in the disk storage section described later (Refer to FIG. 2 and FIG. 57).

The carriage carrier means for transferring the carriage in the longitudinal direction (direction of Y-axis) comprises the cam gear 8; swing arm 37; and a driving means 70 comprising the gear array 71, 72, 73, 74, 75 and the motor 76; or the like.

A slide lever 39 moved reciprocally in the lateral direction (direction of X-axis) is provided in the rear side of the main chassis 6 and in the upper side of the cam gear 8. In this slide lever 39, as shown in FIG. 23, a guide pin 39b planted and provided on the main chassis 6 is inserted and engaged in the guiding long hole 39a and is movably held in the lateral direction, and an engaging pin 39c projecting downward is inserted and engaged in the third cam groove 8c on the cam gear 8 and is movable along the cam groove, and furthermore an engaging pin 39d projecting upward is provided in one edge section of the slide lever. It should be noted that a lower cylindrical member 130 is provided on the top side of the slide lever 39 around the central shaft 8i (Refer to FIG. 23 and FIG. 24), and this lower cylindrical member 130 is engaged in a central hole of the disk separated to be downward by a tray separating means described later, which allows backlash of the disk to be prevented.

When the carriage 30 has reached the reproducing position with the rotational movement of the cam gear 8, the U-shaped engaging piece 32d of the slide plate 32 supported by the carriage 30 engages an engaging pin 39d so as to be located between both edges of the U-shaped portion. When the cam gear 8 kept in this state is further rotated in the counterclockwise direction, as shown in FIG. 24, the slide lever 39 is moved in the direction opposite to the direction of X-axis by means of the cam action of the third cam groove 8c, and at the same time the engaging piece 32d is also moved in the same direction. Then, the reproducing means holding frame 35 is moved upward by means of actions of the slide plate 32, coupling link 33, and the cam hole 32b or the like, and then the turn table 20 supports a disk to be reproduced. When the slide lever 39 is moved in the direction of X-axis, the reproducing means holding frame 35, namely the disk reproducing means is moved downward.

The moving up/down means for moving up and down the reproducing means such as the pickup and turn table comprises the cam gear 8, slide lever 39, slide plates 32, coupling link 33, and cam holes 32b or the like.

Next description is made for a disk holding means for holding a plurality of disks arrayed in the vertical direction (direction of Z-axis).

Figure 25:
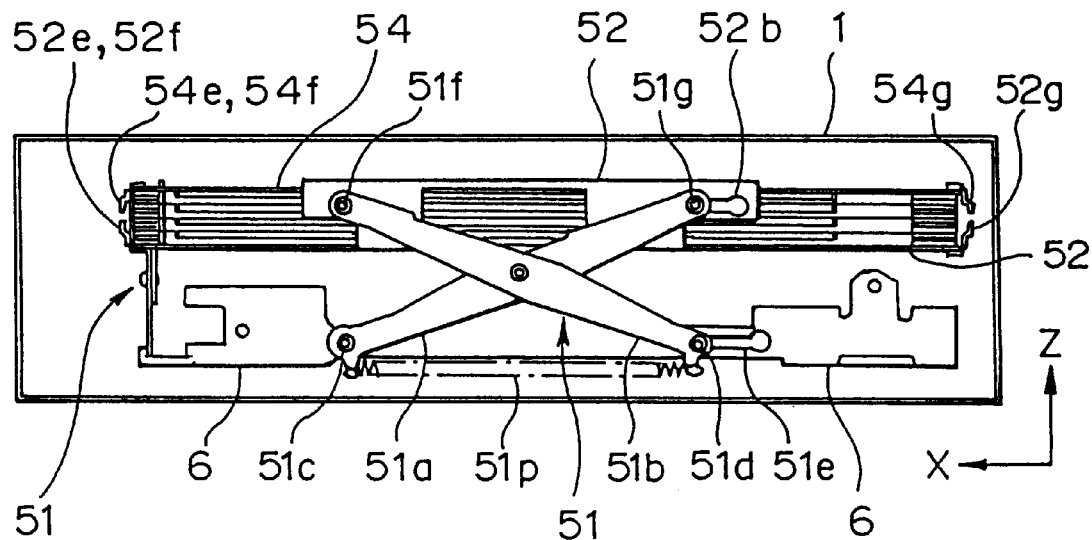
FIGS. 25, 26 are views each showing a disk holding means according to the present invention.
Figure 26:
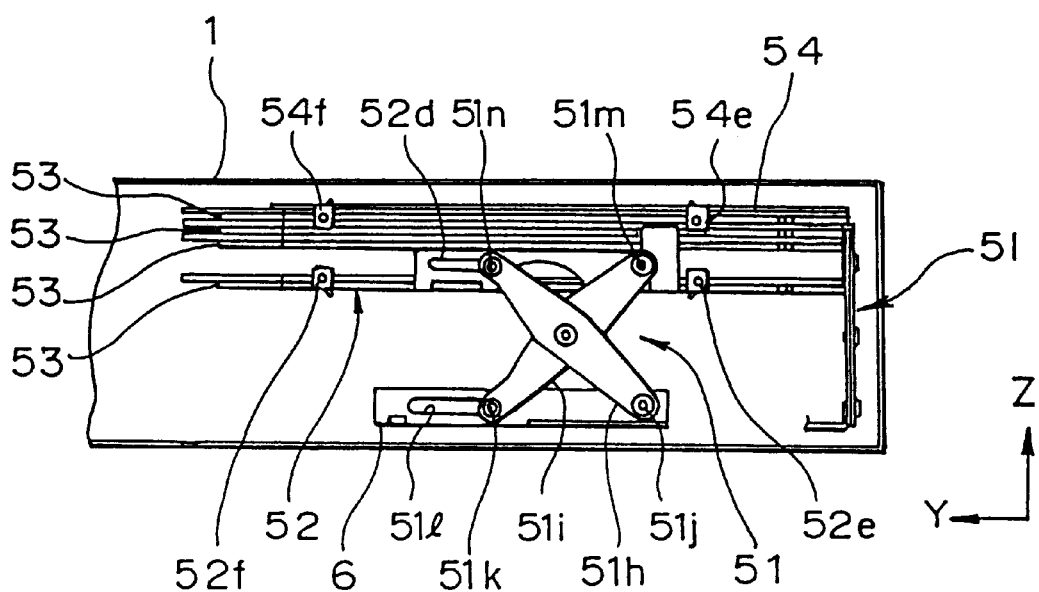

As shown in FIG. 2, a disk holding means 50 is provided in the deepest section in the back of the apparatus and comprises, as shown in FIGS. 25 and 26, a lower holder 52 supported by a pantograph mechanism 51, a plurality of trays 53 (four pieces in the embodiment) for holding disks lay over this lower holder, an upper holder 54 for pressing these trays 53 from the upper side, and a spring 55 (Refer to FIGS. 20 and 21) engaging the lower holder 52 and the upper holder 54 to be energized therebetween so that both of the holders pull each other.

FIGS. 25 and 26 show outline of the disk holding means 50, and FIG. 25 is a rear side of the apparatus, while FIG. 26 is a side view thereof. It should be noted that FIG. 26 shows a state in which the lowest tray is separated from other trays. As shown in the figure, the pantograph mechanism 51 comprises a first lever 51a and a second lever 51b positioned in the rear side as well as a third lever 51h and a fourth lever 51i each positioned in the side face thereof, and one edge of the first lever 51a is supported against the main chassis 6 so that it can rotate around of the supporting shaft 51c, a pin 51g planted and provided on the other edge thereof is slidably inserted and engaged in a long hole 52b of the lower holder 52, while the second lever 51b has a pin 51d planted and provided on one edge thereof that is slidably inserted and engaged in a long hole 51e of the main chassis 6 and the other edge thereof is supported so as to be rotatable around a supporting shaft 51f engaged in a hole 52a of the lower holder 52. Similarly, one edge of the third lever 51h is supported so as to be rotatable around a supporting shaft 51j engaging the main chassis 6, and a pin 51n planted and provided on the other edge thereof is slidably inserted and engaged in a long hole 52d of the lower holder 52, while the fourth lever 51i has a pin 51k planted and provided on one edge thereof that is slidably inserted and engaged in a long hole 51l of the main chassis 6, and the other edge thereof is supported so as to be rotatable around a supporting shaft 51m engaged in a hole 52c of the lower holder 52.

Further, a spring 51p is spanned between the lower edge sections of the first lever 51a and the second lever 51b so that the lower sections thereof are pulled to each other, namely the spring is energized in the direction to which the lower holder 52 is held up by the pantograph 51.

As described above, four pieces of tray 53 for directly holding disks are stuck on each other on the top surface of the lower holder 52 (Refer to FIGS. 27 to 30) supported by the pantograph 51.

The tray 53 comprises, as shown in FIG. 31, a disk holding section 53a for holding a disk D, a region in which a restriction piece 53d positioned at a position close to the periphery of the disk D held by the disk holding section for restricting the disk in the radial direction and the vertical direction (direction of Z-axis) is formed, and three tray supporting sections 53b supported by the tray separating means described later each extending in the lateral direction (direction of X-axis). It should be noted that tapered sections 53c each tapered in the direction of Y-axis are formed in these tray supporting sections 53b, so that the tray separating means described later easily and surely engages each of the tray supporting sections. Also, provided in the right front side is a guide piece 53e extending in the direction of Y-axis, which plays a roll of guiding when the held disk is moved forward to the reproducing position when the disk is to be reproduced or when the disk is returned again to the tray 53. Further, a fabric piece 53f for preventing the held disk from dropping is adhered on the top surface of the disk holding section 53a.

Figure 32:
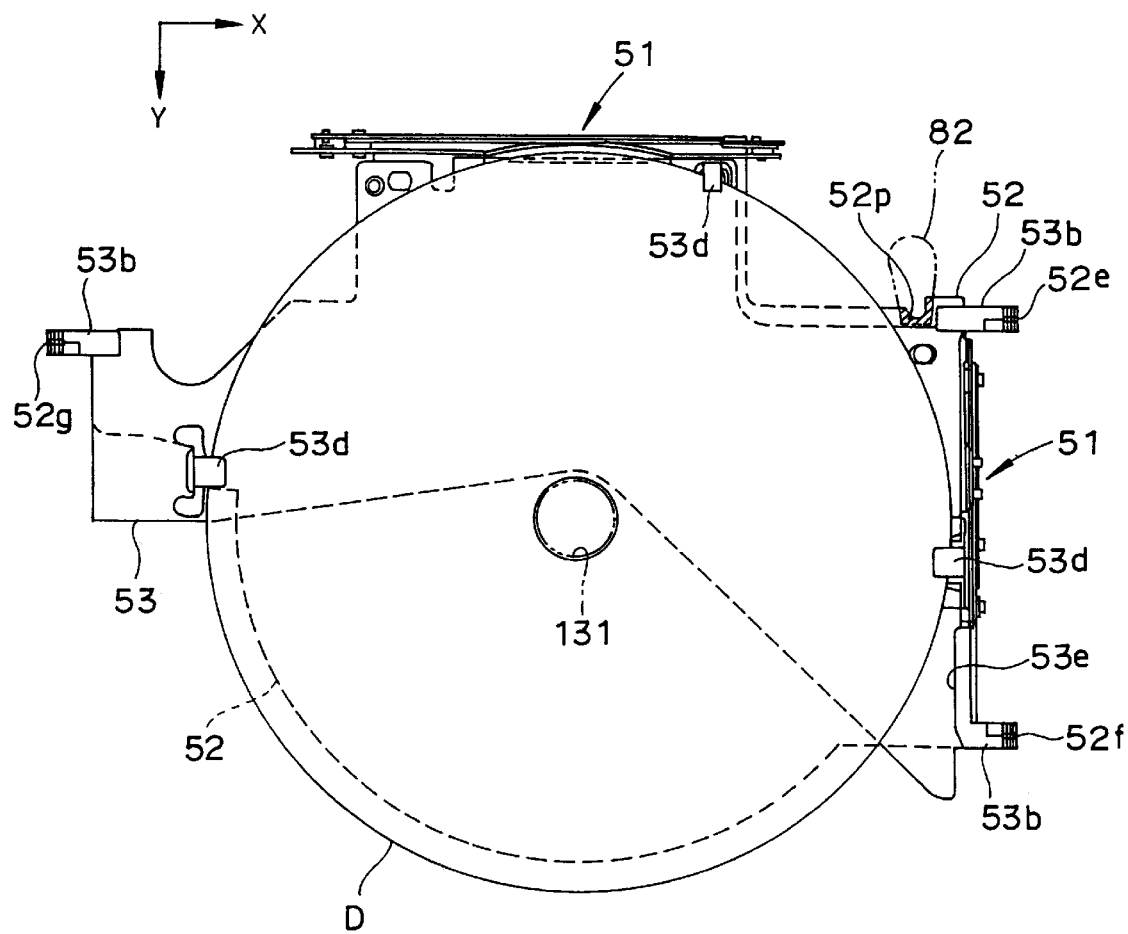
FIG. 32 is a plan view of a disk holding means according to the present invention.

FIG. 32 is a plan view showing a state in which the trays 53 are laid over the lower holder 52 and a disk D is held on each of the trays. As shown in the figure, a region of a rear side section 52p of the lower holder 52 is provided so as to expose even when the trays 53 and disks D are lay over each other, and an abutting member 82 of the moving up/down means described later is abutting with this region 52p.

The upper holder 54 is provided on the top on of the trays laid as described above. Further, a cover plate (not shown in the figure) attached to the upper edge sections of side walls 6a, 6b of the main chassis is provided in the upper side of this upper holder 54, and an upper cylindrical member 131 engaging in the central hole of a disk is provided on the bottom surface inside of the cover plate (Refer to FIG. 3 and FIG. 32). The upper cylindrical member 131 is provided so as to engage in the central hole of the disk separated to be upward by the tray separating means described later and to prevent backlash of the disk.

Figure 33:
FIGS. 33, 34 are views each showing an upper holder according to the present invention.
Figure 34:
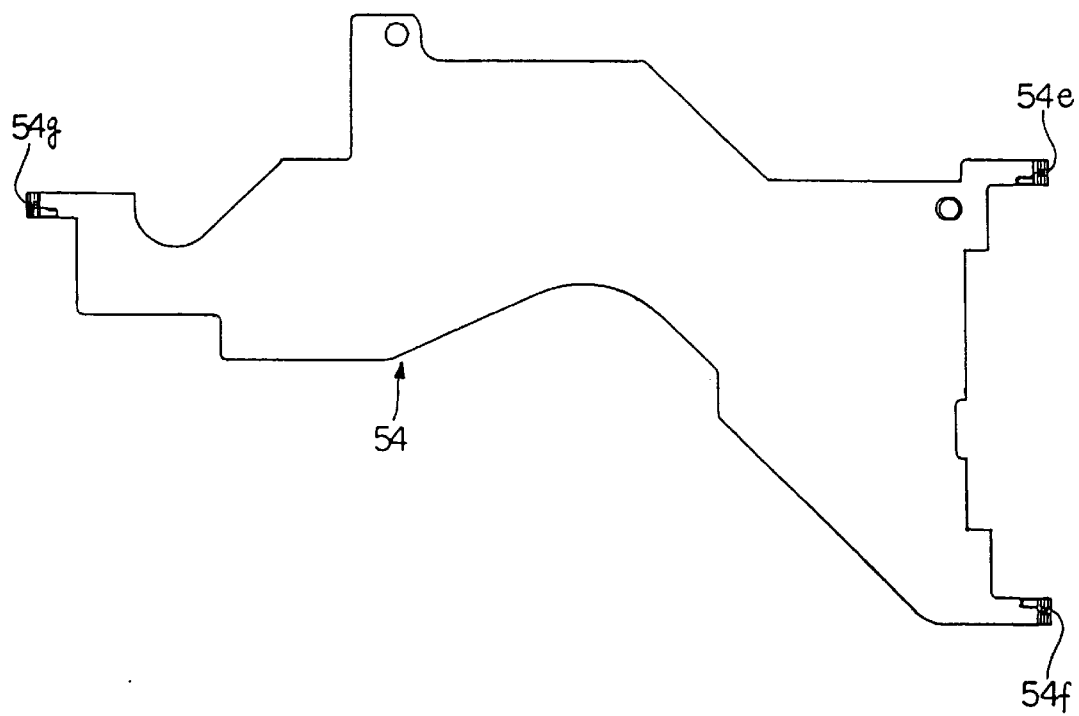

As shown in FIGS. 33 and 34, the upper holder 54 has the substantially same form as that of the tray 53, and also has engaging sections 54e, 54f, and 54g each formed so as to extend in the lateral direction and to hang downward. As shown in FIGS. 27 to 30, the lower holder 52 has engaging sections 52e, 52f, and 52g each formed so as to also extend in the lateral direction and project upward, and each of the springs 55 (Refer to FIGS. 20, 21) is engaged between corresponding engaging sections in each of the lower holder 52 and the upper holder 54 to be energized so as to pull both of the holders to each other namely to hold the lay-over trays 53 from the upper side as well as from the lower side.

Next description is made for a tray separating means 60 for separating, when a desired disk is to be selected from a plurality of disks held on the disk holding means 50 to be reproduced, any tray holding the disk from other ones.

As shown in FIGS. 35 to 37, a slide plate 61 for tray separation is provided on the bottom surface outside of the main chassis 6 along the surface, and two pins 61d planted and provided in the main chassis 6 are inserted in guiding long holes 61b of the plate, and an engaging pin 61a thereof is inserted and engaged in the second cam groove 8b of the cam gear 8 provided in the upper side of the bottom face of the main chassis 6 so as to be movable along the groove 8b.

Namely, the slide plate 61 for tray separation is so supported as to reciprocate in the longitudinal direction (direction of Y-axis) by means of rotation of the cam gear 8.

Figure 45:
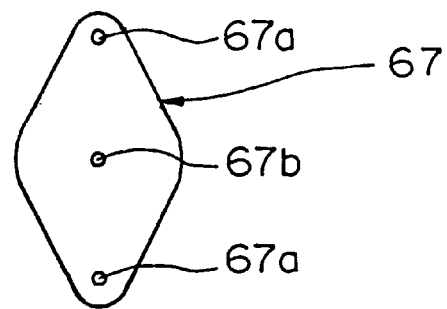
FIG. 45 to FIG. 47 are views each showing one of components constituting the tray separating means according to the present invention respectively.
Figure 46:
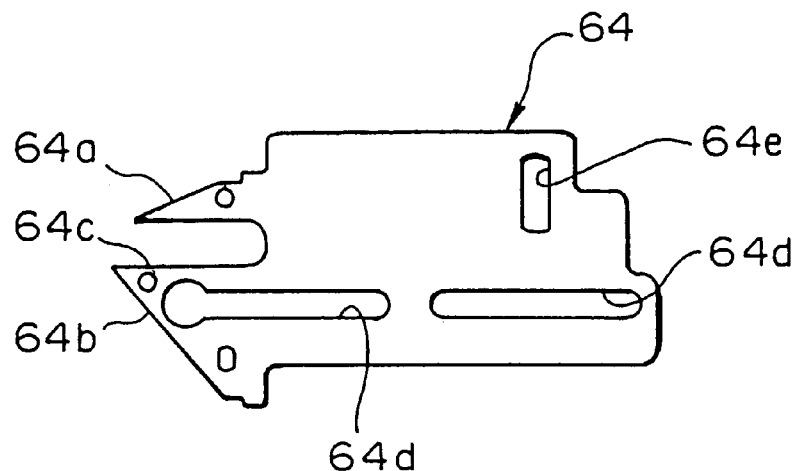
Figure 47:
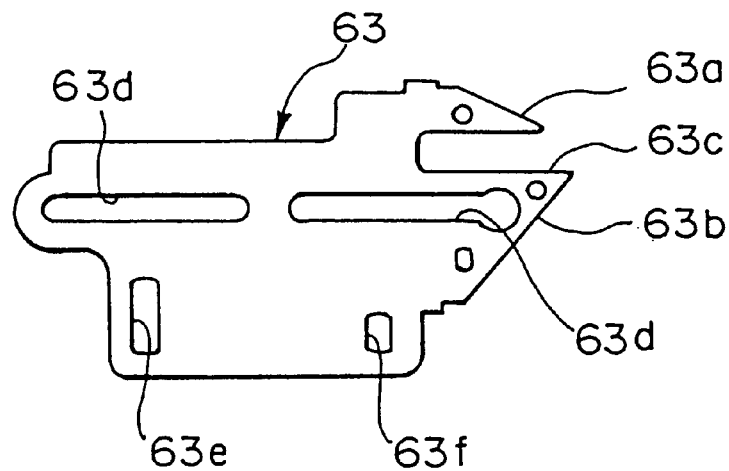

Both edges in the lateral direction (direction of X-axis) of the slide plate 61 for tray separation are bent upward (direction of Z-axis) and engaging pins 61c are planted and provided thereon to be engaged in an engaging hole 63f (Refer to FIG. 47) of a first separating lever 63 as a wedge-formed member and in an engaging hole 66f (Refer to FIG. 45) of a third separating lever 66 also as a wedge-formed member respectively. It should be noted that the first separating lever 63 and a second separating lever 64 are coupled to each other through a coupling plate 67 so as to move in correlation to each other in the directions opposite to each other as described later.

Accordingly, when the cam gear 8 is rotated from the stand-by position shown in FIGS. 35 to 37 by a predetermined angle in the counterclockwise direction by the motor 76 as shown in FIGS. 38 to 40, the slide plate 61 for tray separation is moved toward the rear side (in the backward direction) by a specified distance by means of the cam action of the second cam groove 8b engaged by the engaging pin 61a, and at the same time the first separating lever 63 and third separating lever 66 are moved rearward, while the second separating lever 64 is moved forward (in the front direction) to reach a position where separation is operated.

Figure 41:
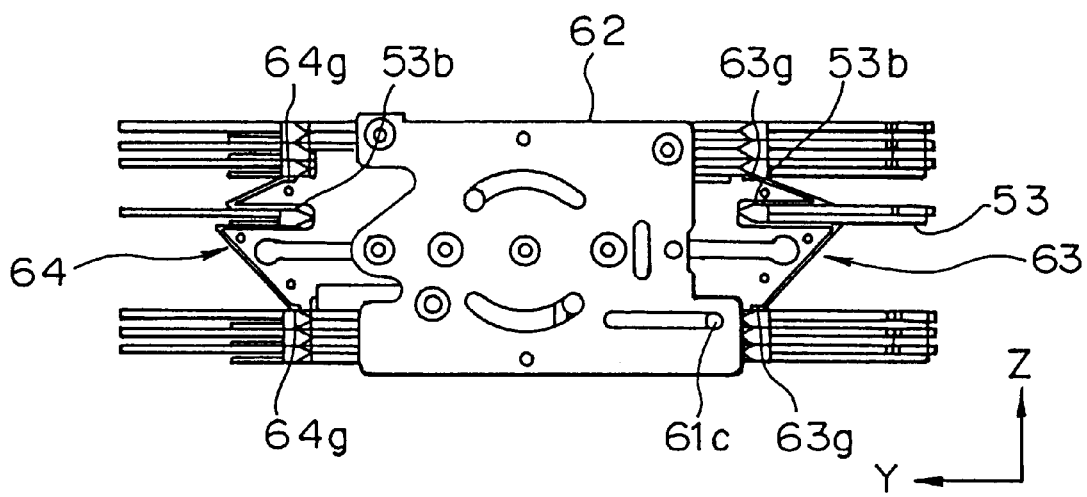
FIGS. 41, 42 are views each showing a state in which the tray holding thereon a selected disk is separated by the tray separating means according to the present invention.
Figure 42:
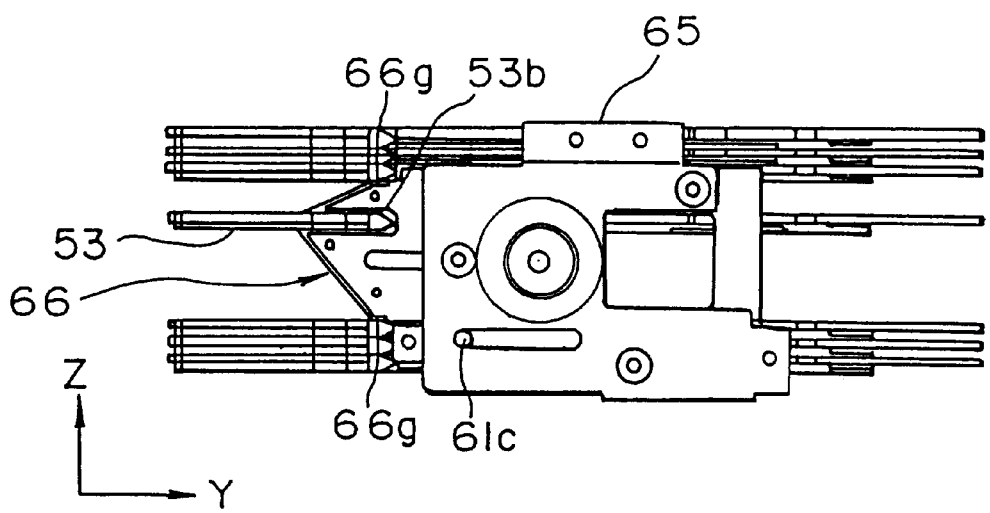

FIGS. 41 and 42 show states each in which the separating levers 63, 64, and 66 operate for separating one of the trays 53 from the other trays, and in the figures, seven pieces of trays are provided in the embodiment, in which the fourth tray (namely a disk) from the bottom is separated from the other trays.

Description is made herein for a construction of a separating lever with reference to FIG. 41 to FIG. 49.

The separating levers 63, 64, and 66 each as a wedge formed member are provided, as shown in FIG. 2, FIGS. 35 to 37, and FIGS. 38 to 40, along the side walls 6a and 6b of the main chassis, and those separating levers are supported through brackets 65 and 62 fixed to the side walls 6a and 6b.

As shown in FIGS. 43, 44 and FIGS. 45 to 47, the first separating lever 63 and second separating lever 64 have guiding long holes 63d and 64d which are supported movably in the longitudinal direction (direction of Y-axis) respectively by engaging a central shaft 67b inserted in the central hole 62a provided in the bracket 62 as well as engaging the guide pins 62b. Also, the substantially diamond-shaped coupling plate 67 is attached to the central hole 62a of the bracket 62 so as to be rotatable around the position of the central shaft 6b, and further an engaging pin 67a provided on the coupling plate 67 is inserted into an engaging hole 63e of the first separating lever 63 as well as into an engaging hole 64e of the second separating lever 64, and also inserted into an arc-shaped groove 62e of the bracket 62 so that the coupling plate 67 is rotatable in a range of the arc-shaped groove 62e.

Figure 43:
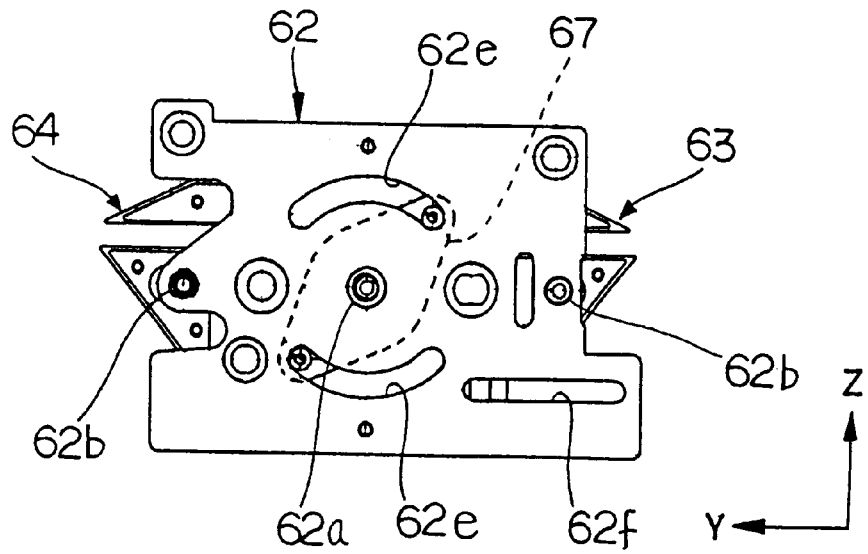
FIGS. 43, 44 are views each showing a construction of the tray separating means according to the present invention.
Figure 44:
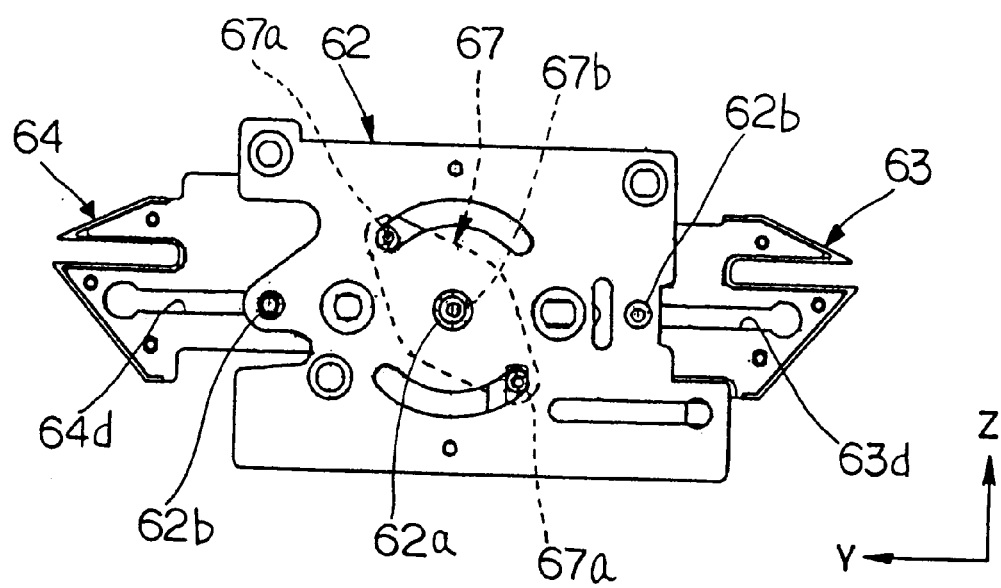

Accordingly, when the engaging pin 61c of the slide plate 61 for tray separation is moved rearward from the stand-by position shown in FIG. 43, the first separating lever 63 moves rearward together with the engaging pin 61c, while the coupling plate 67 is rotated in the counterclockwise direction and the second separating lever 64 moves forward in accordance with the rotation of the plate to reach the position where separation is operated shown in FIG. 44.

Figure 48:
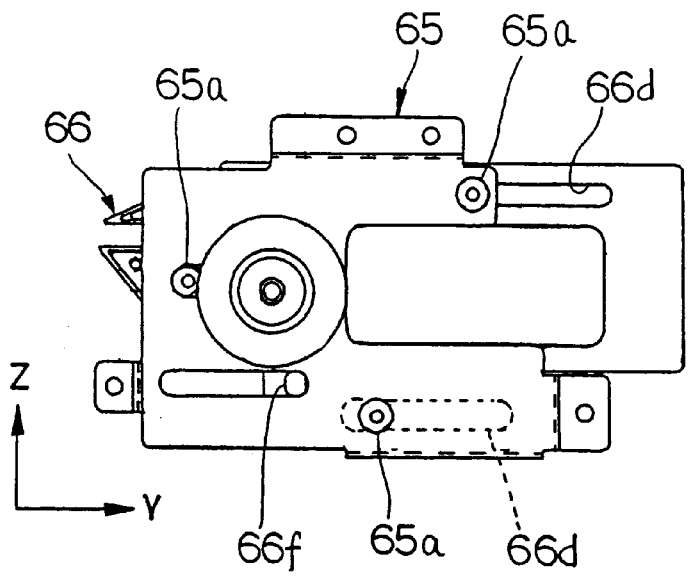
FIGS. 48, 49 are views each showing a construction of the tray separating means according to the present invention.
Figure 49:
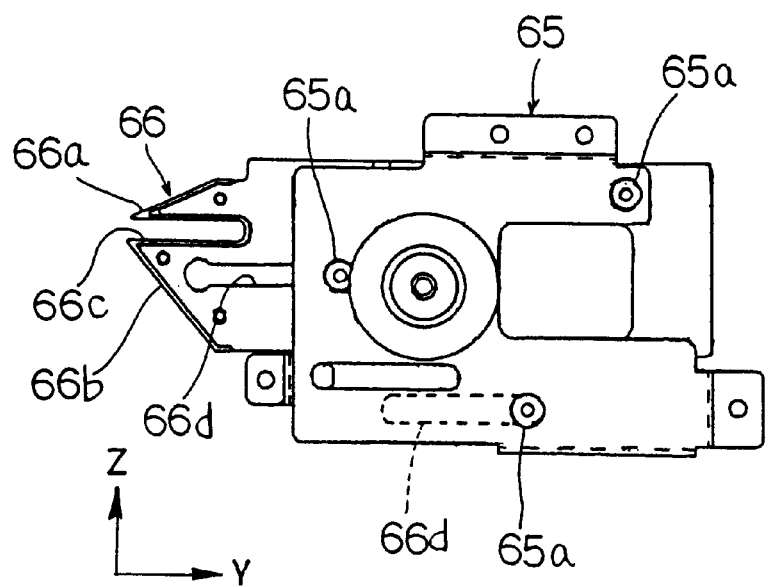

As shown in FIGS. 48 and 49, the third separating lever 66 has guiding long holes 66d thereon that are supported movably in the longitudinal direction by being engaged by the guide pins 65a provided in the bracket 65.

Accordingly, when the engaging pin 61c of the slide plate 61 for tray separation is moved rearward (in the direction opposite to the direction of Y-axis) from the stand-by position shown in FIG. 48, the third separating lever 66 moves rearward together with the engaging pin 61c to reach the position where separation is operated shown in FIG. 49.

Portions for performing an separating action of the separating levers 63, 64, and 66 have substantially wedge forms, and are formed so that the portions have first tapered sections 63a, 64a, and 66a as slope sections going upward smoothly and second tapered sections 63b, 64b, and 66b as slope sections going downward steeply with U-shaped notched sections 63c, 64c, and 66c catching the supporting section 53b of the tray 53 in between respectively.

The second tapered sections 63b, 64b, and 66b have steep slopes as compared to those in the first tapered sections 63a, 64a, and 66a respectively, so that the travel of a tray to be separated downward is longer than that of a tray to be separated upward when the trays are separated to be upward and downward by both of the tapered sections.

Accordingly, a space which a clamping means enters is maintained in the upper side of the tray holding a disk selected for reproduction and a sufficient space is also maintained in the lower side thereof, so that the carriage 30 holding the reproducing means can enter the region in the lower side thereof.

It should be noted that, in the position where the separating operation is executed, as shown in FIGS. 41 and 42, the tray 53 vertically separated by tapered sections is securely fixed in the vertical direction (direction of Z-axis) in contact of the top surface or the bottom surface of the supporting section 53b of the tray with each of flat sections 63g, 64g, and 66g of the separating levers 63, 64, and 66 respectively.

The tray separating means 60 for separating the tray 53 holding a disk to be reproduced from other trays in the vertical direction comprises the second cam groove 8b of the cam gear 8, slide plate 61, the first separating lever 63, the second separating lever 64, the third separating lever 66, and the coupling plate 67.

As described above, as a means for selecting a tray holding thereon a desired disk and separating it from other trays, a wedge-formed member acting from the direction in which the trays are arrayed as well as from the substantially vertical direction is provided, which allows the construction to be simplified and an apparatus to be minimized. Further, a number of trays can easily be increased or decreased, which allows varieties of the apparatus to increase.

Next description is made for the moving up/down means for moving up and down the disk holding means 50 when a specified disk to be reproduced is to be selected and positioning the disk at a specified height in the vertical direction.

Figure 50:
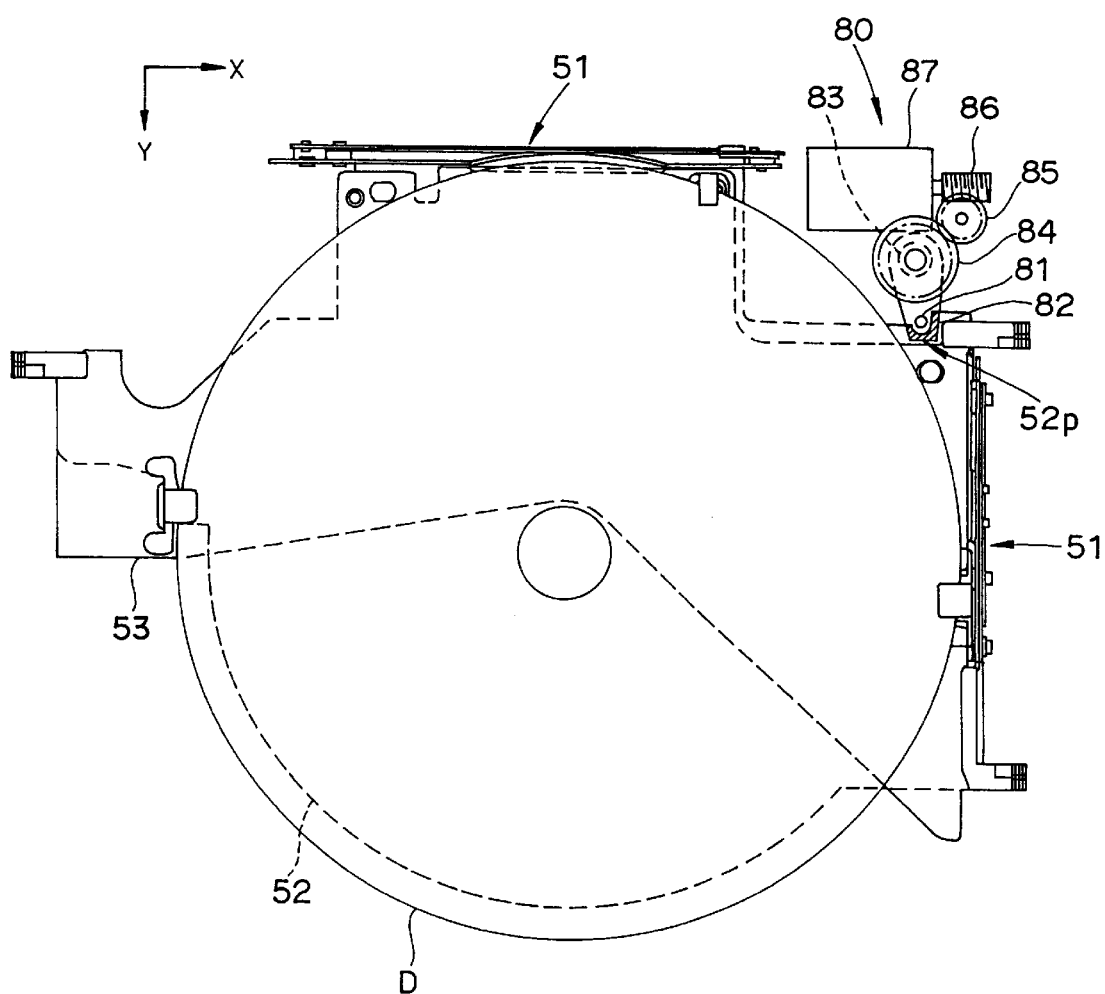
FIG. 50 is a plan view showing a moving up/down means for moving up and down the disk holding means according to the present invention.

As shown in FIG. 50, an abutting member 82 slidably engaging a guide shaft 81 extending in the vertical direction is located in the right back side section of the apparatus so that the member abuts the region 52p of the lower holder 52 from the upper side. This abutting member 82 is screwed by a vertically extending feed screw 83 that is integrally formed with a gear 84. The gear 84 engages a gear 85, and this gear 85 engages a worm 86 fixed to a spindle of a motor 87. Accordingly the abutting member 82 is moved in the vertical direction by rotating the motor 87 through the worm 86, gear 85, gear 84, and feed screw 83. In this step, the lower holder 52 is energized upward by the pantograph mechanism, so that, when the abutting member 82 is move upward, the lower holder 52 is also moved upward following the butting member 82 by means of its resilient force. When the abutting member 82 is moved downward, the lower holder 52 is moved downward against the resilient force.

The moving up/down means 80 for moving up and down the disk holding means 50 and positioning a desired disk at a specified height comprises the guide shaft 81, abutting member 82, feed screw 83, gears 84, 85, worm 86, and motor 87.

Also, the disk selecting means for selecting a desired disk comprises the moving up/down means 80 and tray separating means 60.

Next description is made for a disk-guide positioning means for inserting a disk through the disk insertion slot 5 and positioning the disk on a tray 53 as well as for a disk retrieving means for taking out the disk on the tray 53 to outside of the apparatus.

Figure 51:
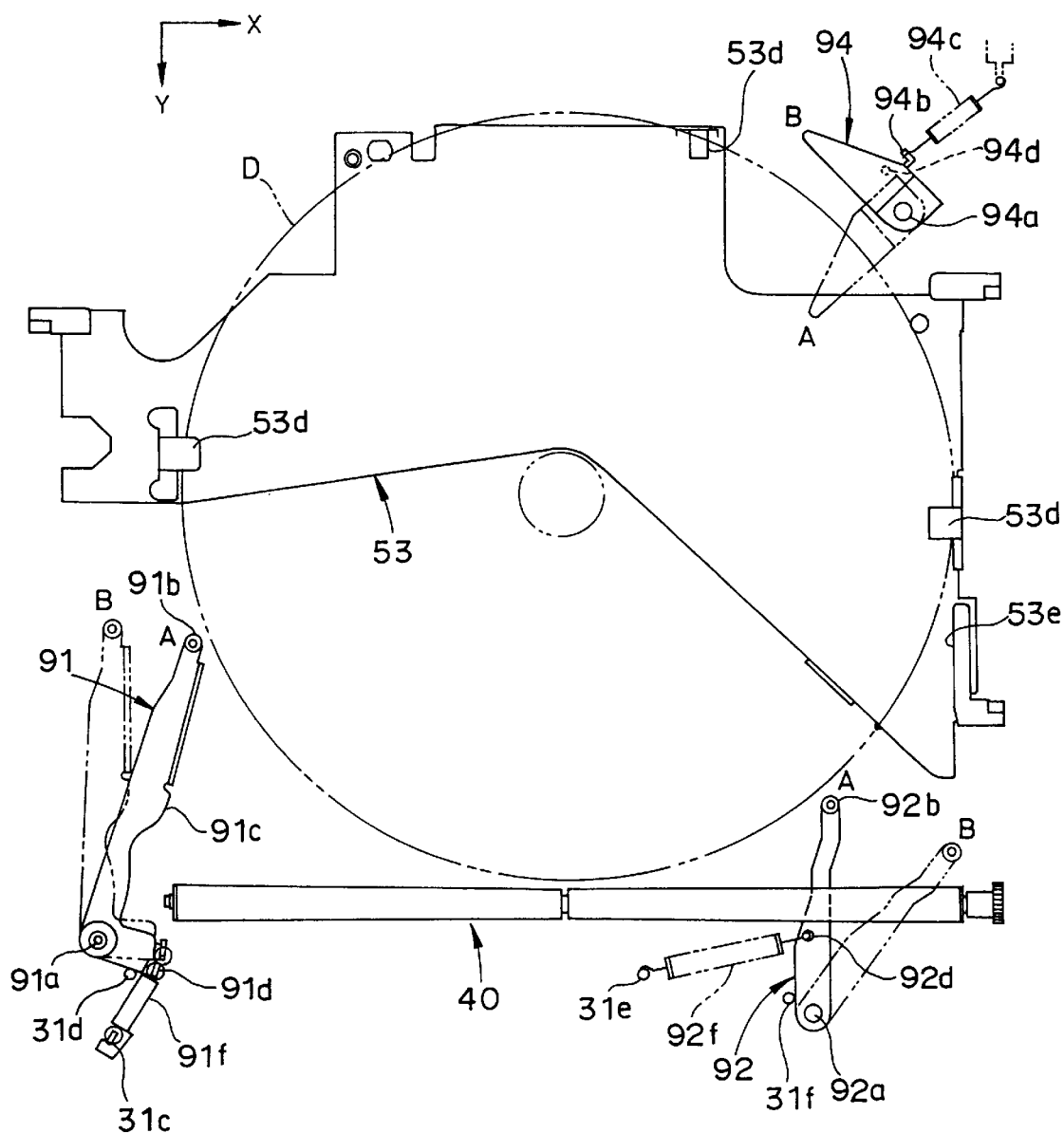
FIG. 51 is a plan view showing a disk-guide positioning means and an ejecting means according to the present invention.
Figure 52:
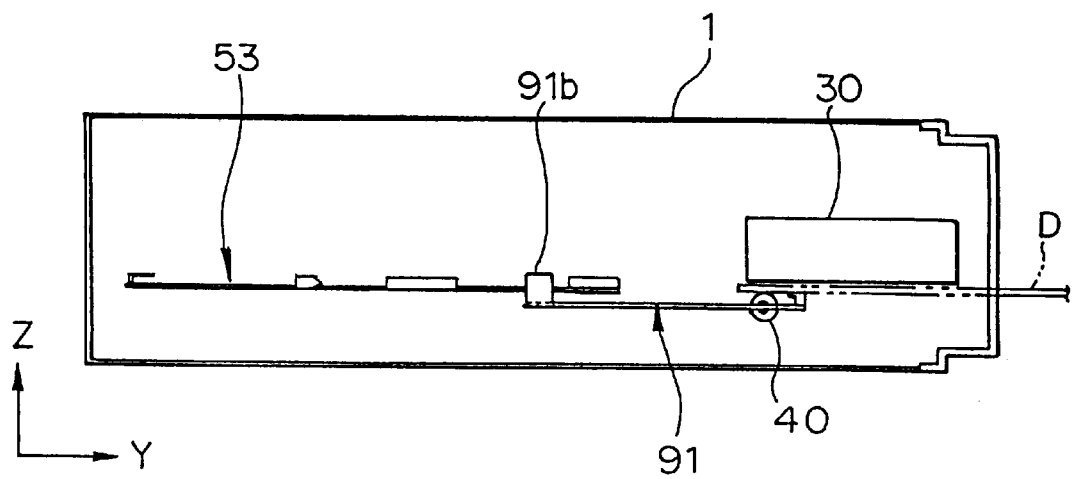
FIGS. 52, 53 are side views each showing a positional relation between a roller and a tray when a disk is carried in and discharged according to the present invention respectively.
Figure 53:
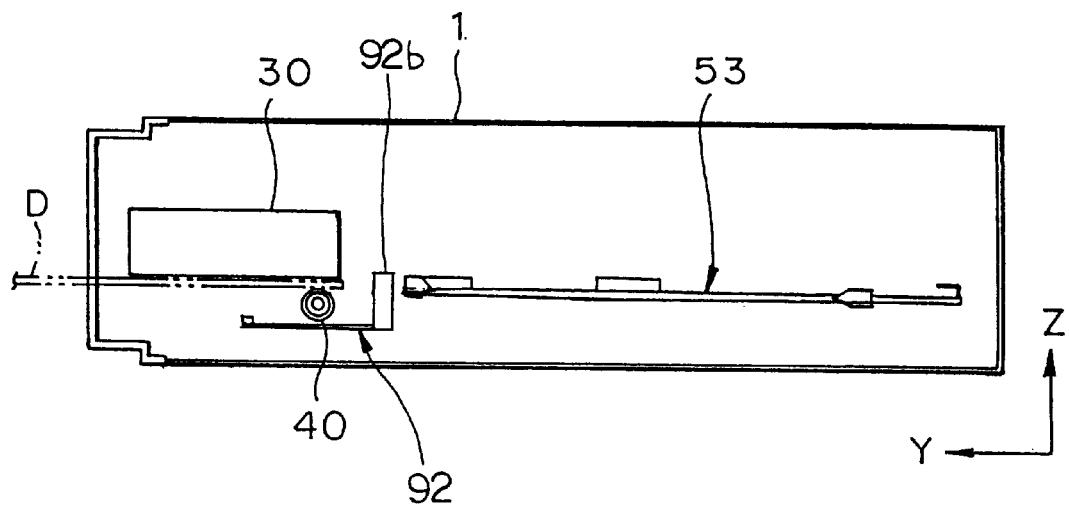

As shown in FIGS. 51 to 53, a disk-guide swing arm 91 engaging the outer periphery of a disk when the disk is transferred and guiding the disk in a specified direction is located in the front left side section of the apparatus. This swing arm 91 is provided so as to be capable of swinging within a horizontal plane around a supporting shaft 91a planted and provided on the top surface of the carriage holding frame 31, and a spring 91f is extended between an engaging piece 31c of the carriage holding frame 31 and an engaging piece 91d of the swing arm and engages a stopper 31d at a stop position A by being energized in the clockwise direction.

Similarly, a disk-guide swing arm 92 engaging the outer periphery of a disk and guiding the disk in a specified direction is located in the front right side section of the apparatus. This swing arm 92 is provided so as to be capable of swinging within a horizontal plane around a supporting shaft 92a planted and provided on the bottom face of the carriage holding frame 31, and a spring 92f is provided between an engaging piece 31e of the carriage holding frame 31 and an engaging piece 92d of the swing arm and engages a stopper 31f at a stop position A as being urged in the counterclockwise direction.

In the structure having the arm as described above, when a disk is transferred towards the interior of the apparatus by the roller 40, the outer periphery of the disk engages serially engaging sections 92b and 91b of the arms 92 and 91 respectively, which makes each of the arms swing toward a retreat position B against a resilient force of the spring. Further, when the disk is transferred to the internal side thereof, the disk leaves the roller 40 at a certain point of time, so that a driving force of the roller 40 does not effect thereon. At this point of time, the disk-guide swing arms 91 and 92 make the disk moved toward a specified holding section 53a for the tray 53 by means of the resilient force, and then the operation of transferring the disk is completed.

Transfer of disks to all trays 53 can be achieved by positioning each of the trays at a specified height with the operation of the moving up/down means.

It should be noted that all the engaging sections 91b and 92b of the arms 91 and 92 are slightly spaced, when a disk is located at a specified holding position on the tray 53, from the outer periphery of the disk.

When a disk on the tray 53 is to be ejected to outside of the apparatus, the disk is pushed out by means of action of an ejecting arm 94 provided in the back side of the apparatus so as to be capable of swinging around a supporting shaft 94a and extended by a spring 94c between an engaging piece 94b of the arm and an engaging piece of the chassis to be energized in the clockwise direction. Namely, the roller 40 is rotated in the opposite direction to that at the time of taking it in, and at the same time the ejecting arm 94 is rotated by a driving means (not shown in the figures) in the counterclockwise direction from a retreat position B to an acting position A. Then a free edge of the ejecting arm 94 engages the outer periphery of the disk to push up the disk forward. This movement of the disk makes the arms 92, 91 swing toward the retreat positions B respectively. Then, when the front portion of the disk is held between the roller 40 and the bottom surface of the carriage 30, the disk is transferred toward the disk insertion slot 5 by means of the driving force of the roller 40.

With the guiding effect of those arms 91, 92, restriction piece 53d, and guide piece 53e as well as with the self-centering effect of the roller 40 with the central section thereof in the axial direction formed in a tapered form, a disk is securely transferred in the longitudinal direction (direction of Y-axis) without displacement of the disk in the lateral direction (direction of X-axis).

The disk-guide positioning means comprises the disk-guide swing arms 91 and 92, restriction piece 53d, guide piece 53e, and the roller 40 with a tapered structure formed so that the outer diameter of the roller increases from the center toward both edges thereof.

Also the disk ejecting means for ejecting a disk from the apparatus comprises the ejecting arm 94 and the roller 40.

It should be noted that the disk-guide swing arm 91 is swung once to the retreat position B when a disk is reproduced, which allows the carriage 30 to move. Namely there is a construction that, when reproduction is started, if the carriage 30 is moved rearward, the rolling ring 30d engaging the engaging pin 30c projecting downward from the bottom face of the carriage 30 engages an edge section 91c of the swing arm 91 to make the swing arm 91 swing in the counterclockwise direction in accordance with the rearward movement of the carriage 30 so that the upright engaging section 91b of the swing arm 91 does not contact the bottom surface nor the side face of the carriage 30.

Accordingly, a space required for installation of the components can be reduced by a space for the height of the upright engaging section 91b of the swing arm 91, and with this feature, and the thickness of the apparatus can be made thinner, which allows the apparatus to be minimized as a whole.

Next description is made for a clamping means 100 for clamping a disk in cooperation with the turn table when the disk is reproduced.

Figure 54:
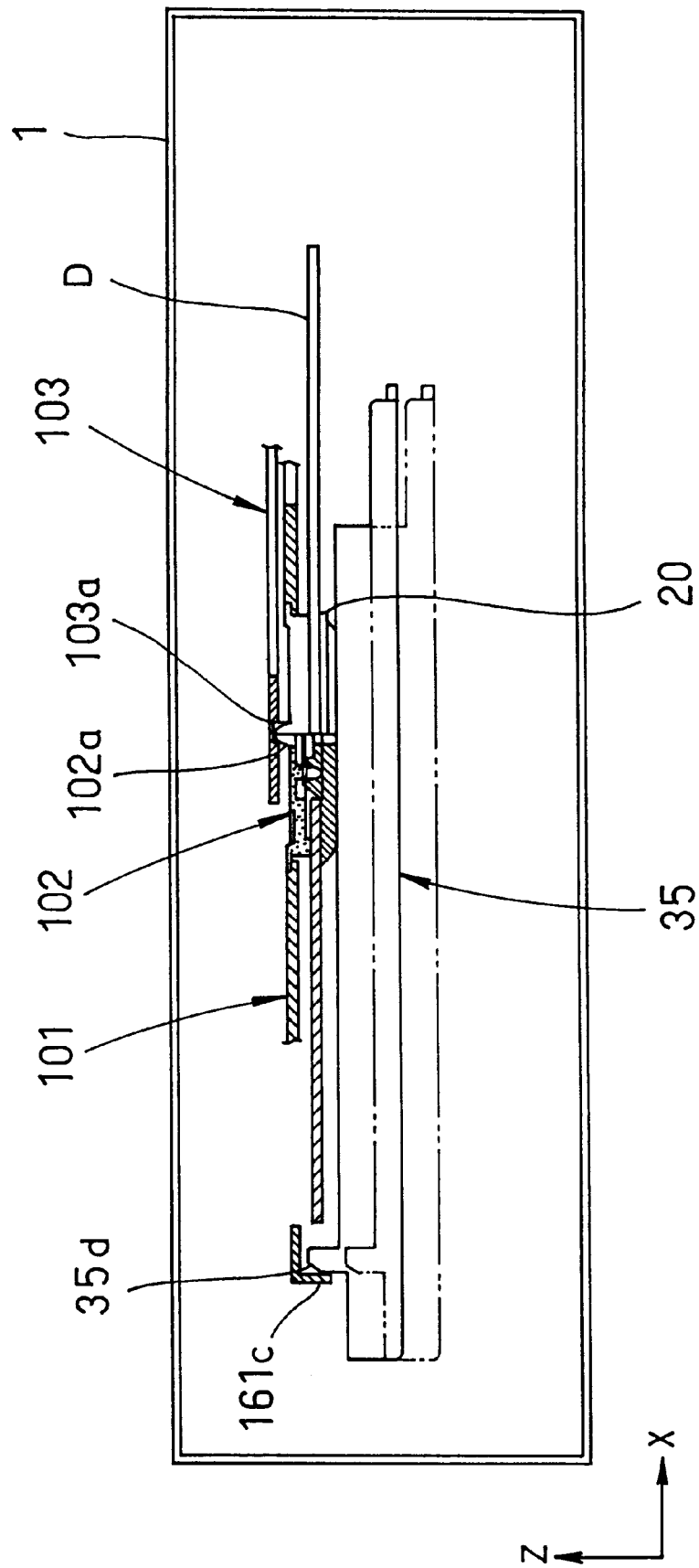
FIG. 54 is a front view of a clamping means according to the present invention.

As shown in FIG. 54 and FIG. 2, the clamping means 100 for pressing down and fixing a disk to be reproduced from the upper side toward the turn table 20 is located above the carriage 30. Namely, the damper frame 101 is provided above the pickup 10 and the turn table 20 or the like in a specified space therebetween and fixed to the carriage 30. Then, a clamper 102 is inserted in a hole provided in the clamper frame 101 from the upper side, and the outer peripheral edge of the clamper is supported and is energized by a spring arm 103 from the further upper side to the lower side. When a disk is to be clamped, the clamper 102 is slightly pushed upward to leave the clamper frame 101, and a supporting pin 102a of the clamper 102 is rotatably supported by a bearing hole 103a of the spring arm 103.

The clamping means 100 for clamping a disk in cooperation with the turn table 20 comprises the clamper frame 101, clamper 102, spring arm 103, and the bearing hole 103a.

It should be noted that, in FIG. 54, the reproducing means holding frame 35 indicated by a solid line shows the frame located at the reproducing position, and the frame indicated by a phantom line shows the frame located at a stand-by position respectively.

Next description is made for a disk retrieving means 140 for taking out a desired disk held on the tray 53 in the forward direction (direction of Y-axis) toward the disk reproducing means.

Figure 55:
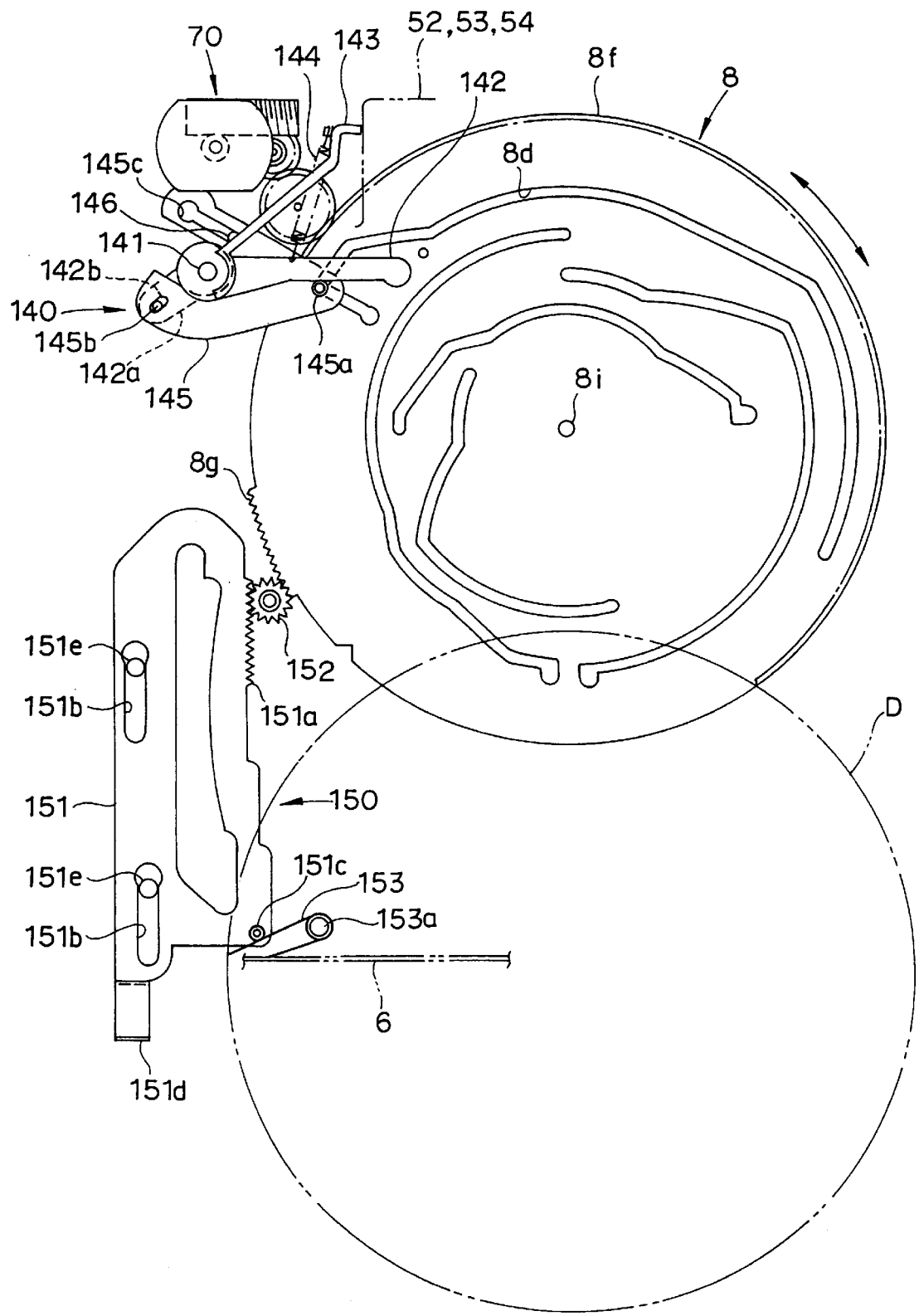
FIG. 55 is a plan view showing a locking means for locking a disk retrieving means as well as the disk holding means according to the present invention.
Figure 56:
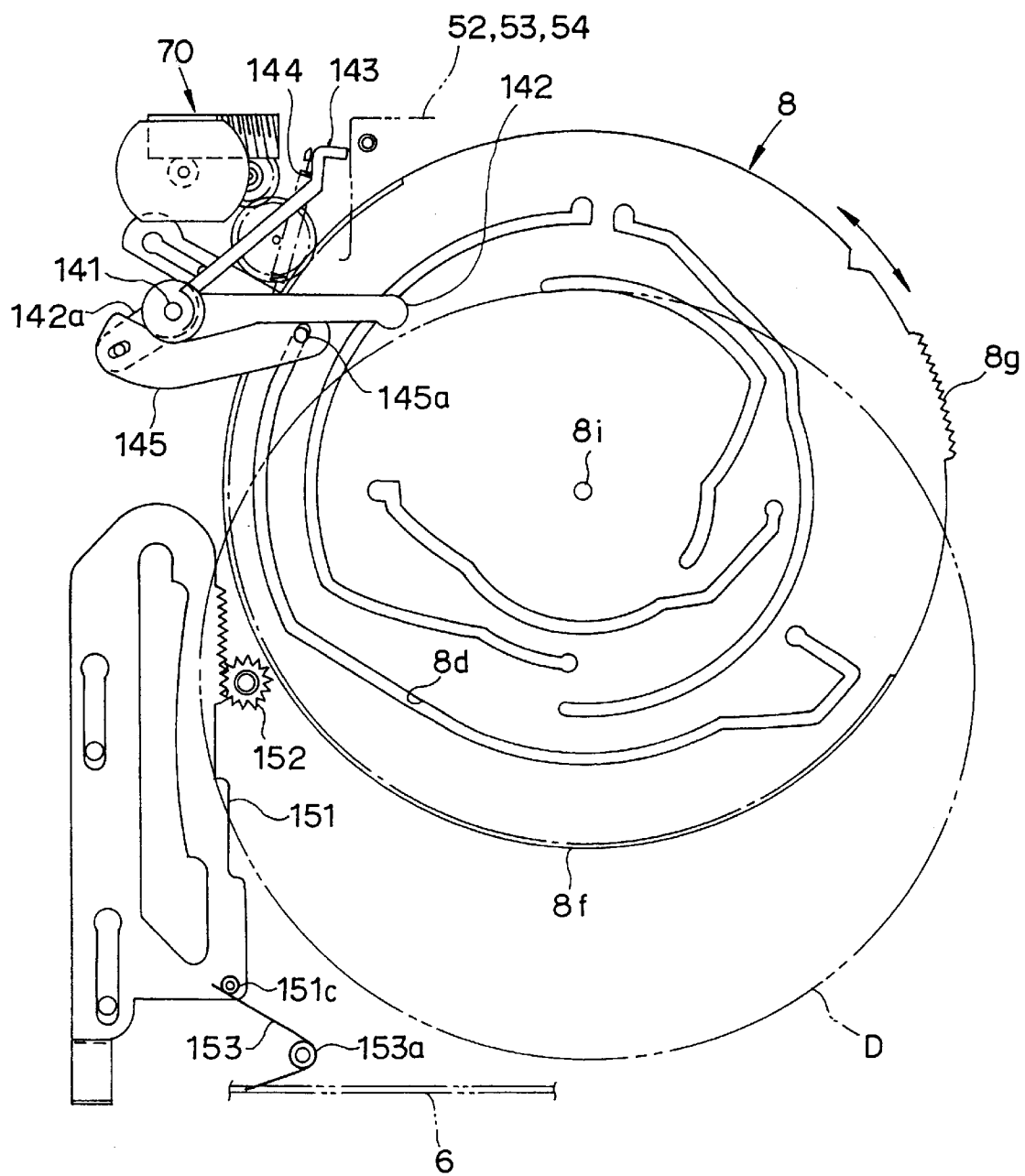
FIG. 56 is a plan view showing the locking means for locking the disk retrieving means as well as the disk holding means according to the present invention.

As shown in FIG. 55 and FIG. 56, the disk take-out means 142 and a lock arm 143 for locking the disk holding means 50 are coaxially provided in the left back side section of the apparatus so as to be rotatable around the supporting shaft 141 planted and provided on the main chassis. It should be noted that the disk take-out means 142 and the lock arm 143 are energized by a spring 144 in the direction of approaching each other. Also, a coupling arm 142a is integrally formed in the lower edge of the rotational center in the disk retrieve arm 142, and a long hole 142b is provided in a free edge side of the arm. Further, a V-shaped slide lever 145 is located above the coupling arm 142a and the cam gear 8, a guide pin 146 is inserted into a long hole 145c of the lever 145, and engaging pins 145a, 145b of the lever are inserted into the cam groove 8d as well as a long hole 142b, so that the slide lever 145 reciprocates in a specified direction by means of rotation of the cam gear 8.

Namely, the slide lever 145 reciprocates in association with rotation of the cam gear 8, which makes the disk retrieve arm 142 rotate.

FIG. 55 shows a state of the disk take-out means 140 when a disk is inserted through the disk insertion slot 5. In this state, the disk retrieve arm 142 has rotated by a specified angle in the clockwise direction, the lock arm 143 also rotates in the clockwise direction by means of a resilient force of the spring 144, the free edge of the lock arm engages the lower holder 52, four trays 53, and one edge of the upper holder 54, which prevents backlash of the components. Accordingly, when a disk is to be transferred to a specified tray, positional displacement of a disk can be prevented, and the disk can securely be transferred.

FIG. 56 shows a state of the disk take-out means when a disk stored and held on the tray 53 of the disk holding means is moved to the reproducing position in the front side. This state indicates a state where the cam gear 8 rotates by a specified angle in the counterclockwise direction from the state shown in FIG. 55, and during the rotation of the cam gear 8, the disk retrieve arm 142 and the lock arm 143 rotate in the counterclockwise direction, as shown in FIG. 2, to leave the disk holding means and then rotate again in the clockwise direction as shown in the figure. During the rotation in the clockwise direction, the free edge of the disk retrieve arm 142 engages the outer periphery of a disk to be reproduced to push the disk forward, and at the same time the pushed-out disk is guided by the guide piece 53e of the tray to be positioned at the reproducing position (the central position C2 in FIG. 2) while the disk is restricted by a disk returning arm described later. It should be noted that FIG. 56 shows a state where the disk is positioned at the reproducing position and is clamped by the clamping means and then the disk retrieve arm 142 is slightly rotated in the counterclockwise direction to be away from the outer periphery of the disk.

The disk take-out means for taking out a disk to be reproduced from a tray when the disk is to be reproduced as well as the locking means for locking the disk holding means at specified positions comprise the supporting shaft 141, disk retrieve arm 142, lock arm 143, spring 144, V-shaped slide lever 145, and the cam groove 8d.

Figure 57:
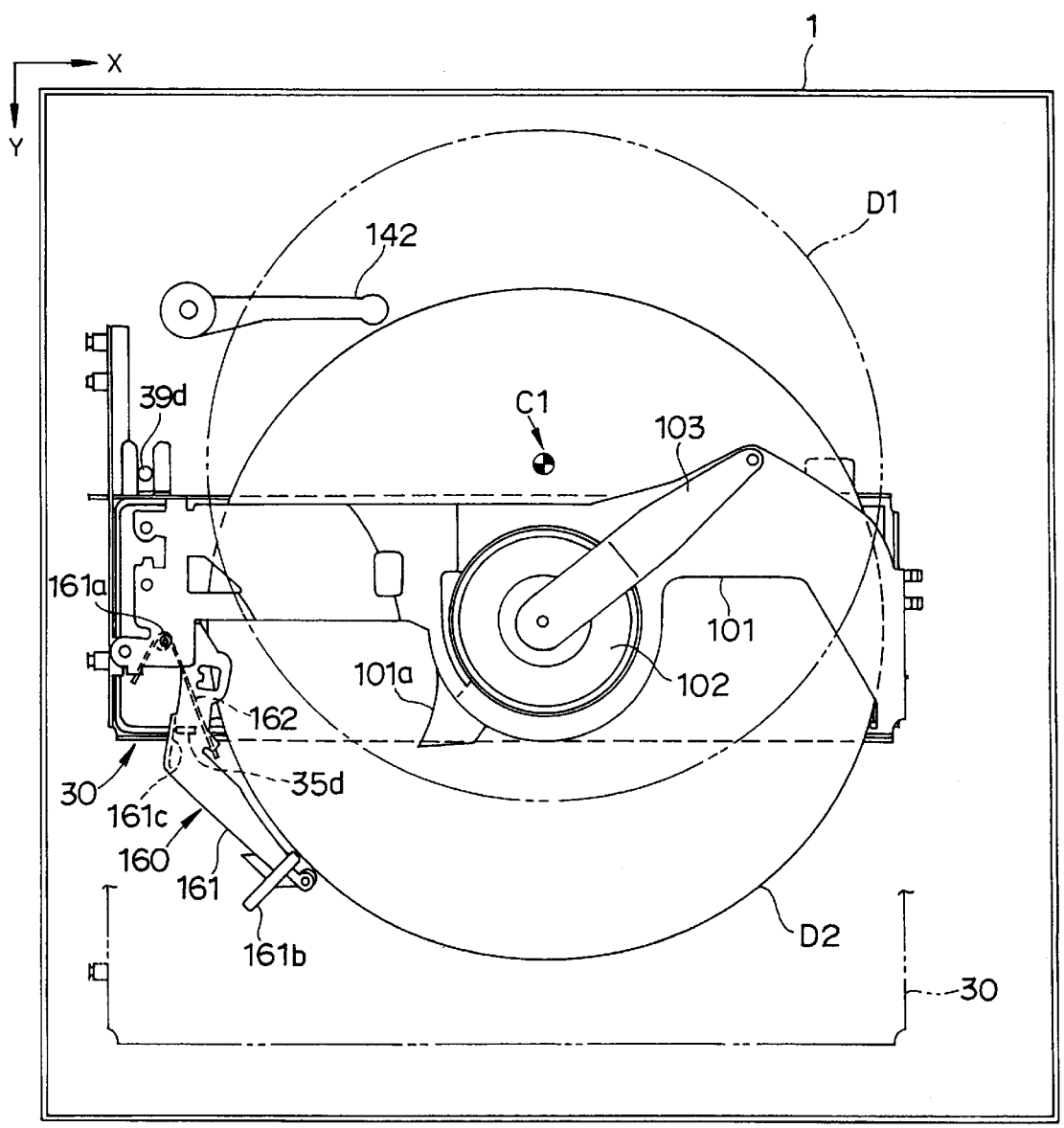
FIG. 57 is a plan view showing a disk returning means according to the present invention.

Next description is made for a disk returning means 160 for returning a disk of which has been reproduced to a specified tray 53. As shown in FIG. 57, a disk returning arm 161 is located in the lower left side of the clamper frame 101 so as to be rotatable around a supporting shaft 161a. This disk returning means 161 is energized, when the carriage 30 is located at the stand-by position (the position indicated by the two-dot chain line), by a spring 162 so that the free edge of the arm is directed toward the rear side of the apparatus by rotating in the counterclockwise direction, and engages a stopper (not shown in the figure) formed in the clamper frame 101.

FIG. 57 shows a state of a disk at the reproducing position, and when the disk is pushed out by the disk retrieve arm 142 from the storing position (D1) to the reproducing position (D2), the free edge of the disk returning arm 161 engages the outer periphery of the disk, and the disk returning arm 161 rotates in the clockwise direction in accordance with the forward movement of the disk. Then, the disk reaches the reproducing position, the reproducing means holding frame 35 moves upward, and the disk is clamped by the clamper 102, and at the same time or in a slight delay thereafter, the tapered engaging piece 35d of the reproducing means holding frame 35 engages a hanging piece 161c of the disk returning arm 161 (Refer to FIG. 54) and the disk returning arm 161 is further rotated slightly in the clockwise direction by means of the cam action due to the tapered section of the cam to leave the outer periphery of the disk, and simultaneously with this leaving operation, the disk retrieve arm 142 also slightly rotates in the counterclockwise direction to leave the outer periphery of the disk, then the state shown in the figure is obtained.

When reproduction is finished and the reproducing means holding frame 35 moves down, the hanging piece 161c and the engaging piece 35d are disengaged from each other simultaneously when or right before the clamping of the disk is released, and then the disk returning arm 161 rotates in the counterclockwise direction to engage the outer periphery of the disk. The disk retrieve arm 142 also rotates in the clockwise direction to engage the outer periphery of the disk. Then, when the cam gear 8 rotates in the clockwise direction, the disk is returned to a tray 53 while the disk returning arm 161 rotates in the counterclockwise direction by the resilient force of the spring 162 in accordance with rotation of the disk retrieve arm 142 in the counterclockwise direction. It should be noted that the disk returning arm 161 is so constructed that the engaging piece 161b thereof is temporarily guided by the guide plate 101a formed in a portion of the clamper frame so that the rotation can smoothly be executed.

Next description is made for a cover driving means 150 for operating the cover for opening or closing the disk insertion slot 5 when a disk is to be taken in or taken out through the disk insertion slot 5.

As shown in FIG. 55 and FIG. 56, a slide plate 151 is located on the top surface of the main chassis 6 in the front left side of the apparatus, a guide pin 151e planted and provided on the main chassis is inserted into a long hole 151b of the plate, so that the plate can reciprocate in the longitudinal direction (direction of Y-axis). A rack 151a engaging a gear 152 that can engage the teeth 8g of the cam gear 8 is formed on the slide plate 151, so that the plate can be reciprocated in the longitudinal direction in accordance with rotation of the cam gear 8. Further, one edge of the spring 153 engages the engaging pin 151c planted and provided on the right front edge section of the slide plate 151 and the slide plate 151 is always energized to move rearward.

In the construction as described above, as shown in FIG. 55, when the cam gear 8 is rotated in the clockwise direction, the slide plate 151 is moved forward through the teeth 8g, gear 152, and the rack 151a, the front edge section 151d of the plate engages the cover to open the disk insertion slot 5. When, as shown in FIG. 29, the cam gear 8 rotates in the counterclockwise direction and the teeth 8g do not engage the gear 152, the slide plate 151 is moved rearward by means of the resilient force of the spring 153, and the front edge section 151d thereof leaves the cover, whereby the disk insertion slot 5 is closed.

The cover driving means 150 for opening and closing a cover comprises the slide plate 151, gear 152, teeth 8g, and the spring 153.

Next description is made for a locking means for locking the main chassis 6 against the housing 1 when the carriage 30 is located at a stand-by position and a disk is not reproduced.

Figure 58:
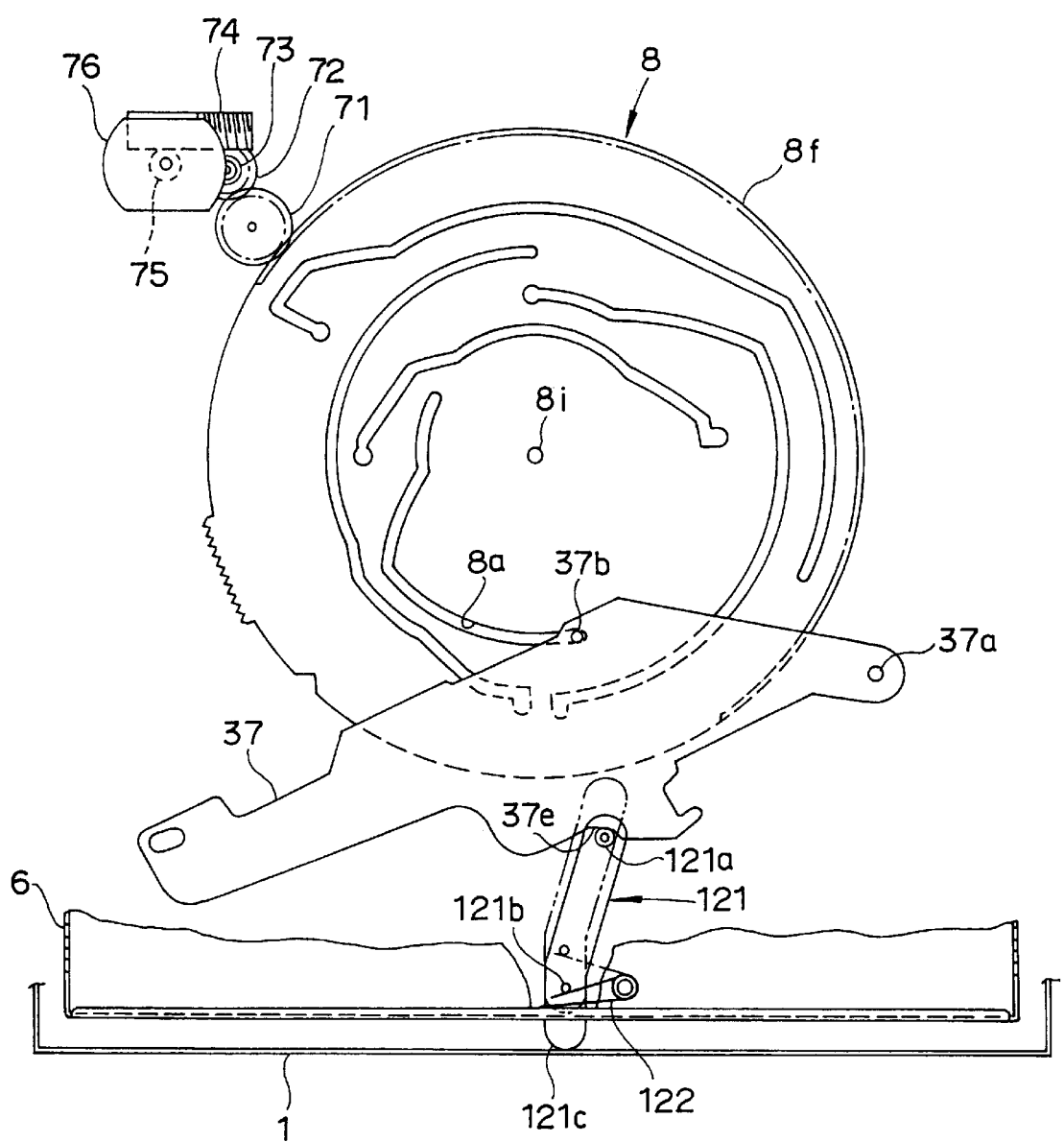
FIG. 58 is a plan view showing a locking means in the main unit of the apparatus according to the present invention.

As shown in FIG. 58, a lock lever 121 lengthy in the longitudinal direction (direction of Y-axis) is located in the bottom surface (outside of the bottom face) of the main chassis, pins 121a and 121b planted and provided on this lever 121 are inserted and engaged in guide long holes (not shown in the figure) formed in the main chassis 6 respectively to be energized so as to be capable of reciprocating in the longitudinal direction as well as to move rearward (toward the back of the apparatus) by a spring 122.

Also the pin 121a of the lock lever 121 extends upward so that it can engage a cam section 37e of the swing arm 37.

The main chassis 6 is supported through the supporting member (Refer to FIG. 2) such as rubber cushions so that a specified space between the chassis and the internal wall of the housing 1 can be maintained because of the necessity to prevent vibration when a disk is reproduced (this state is referred to as a neutral position).

When the swing arm 37 is swung by rotation of the cam gear 8 in the clockwise direction from this neutral position, namely from the position corresponding to that when the carriage 30 is located at the reproducing position toward a position corresponding to that when the carriage 30 is located to the frontward stand-by position, the cam section 37e formed in the front side of the substantially middle section of the swing arm 37 engages the pin 121a, the lock lever 121 is projected forward from the front edge of the main chassis 6 with the edge section 121c of the lock lever abutting the internal surface of the front wall of the housing 1.

By abutting the lock lever 121 to the housing 1, the supporting member such as rubber cushions is forcefully deformed in the longitudinal direction, and the main chassis 6 is moved rearward (toward the back of the apparatus) by a specified distance L relatively to the housing 1.

With this feature, the main chassis 6 is energized in one direction to the housing 1 and a locking effect can be obtained by means of this resilient force. Also the main chassis 6 is relatively moved rearward, whereby a space can be maintained between the front edge of the main chassis and the front wall of the housing 1, so that the carriage 30 can be moved to this region (so as to project forward from the main chassis).

Accordingly, differently from a structure in which a space for vibration isolation is constantly maintained between the main chassis 6 and the housing 1, the apparatus according to the embodiment of the present invention has the construction in which a portion of the apparatus can be made stand-by using the space at the time of non-reproduction when vibration isolation is not required, which allows depth dimensions of the apparatus to be reduced by the dimensions L and the apparatus to be minimized as a whole.

Figure 59:
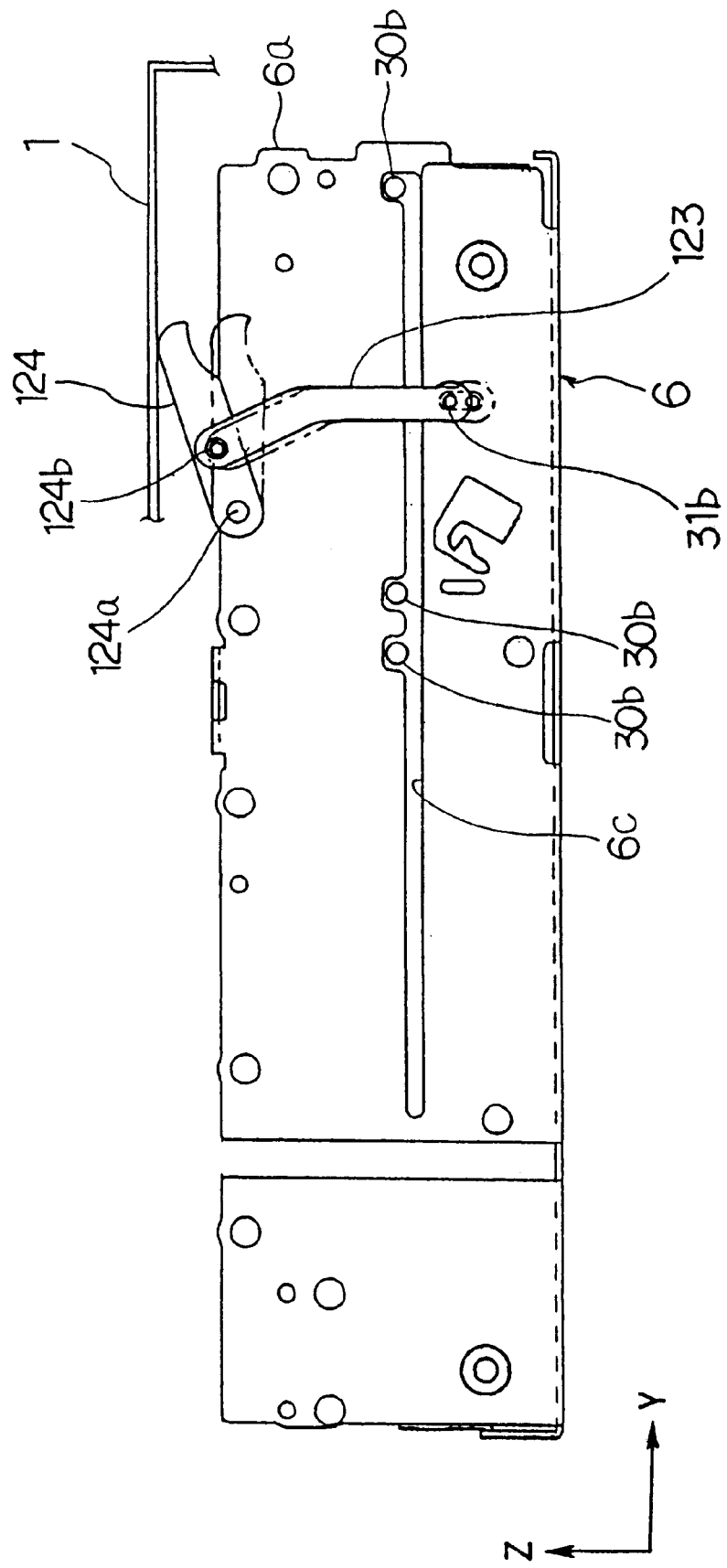
FIG. 59 is a left side view showing the locking means in the main unit of the apparatus according to the present invention.
Figure 60:
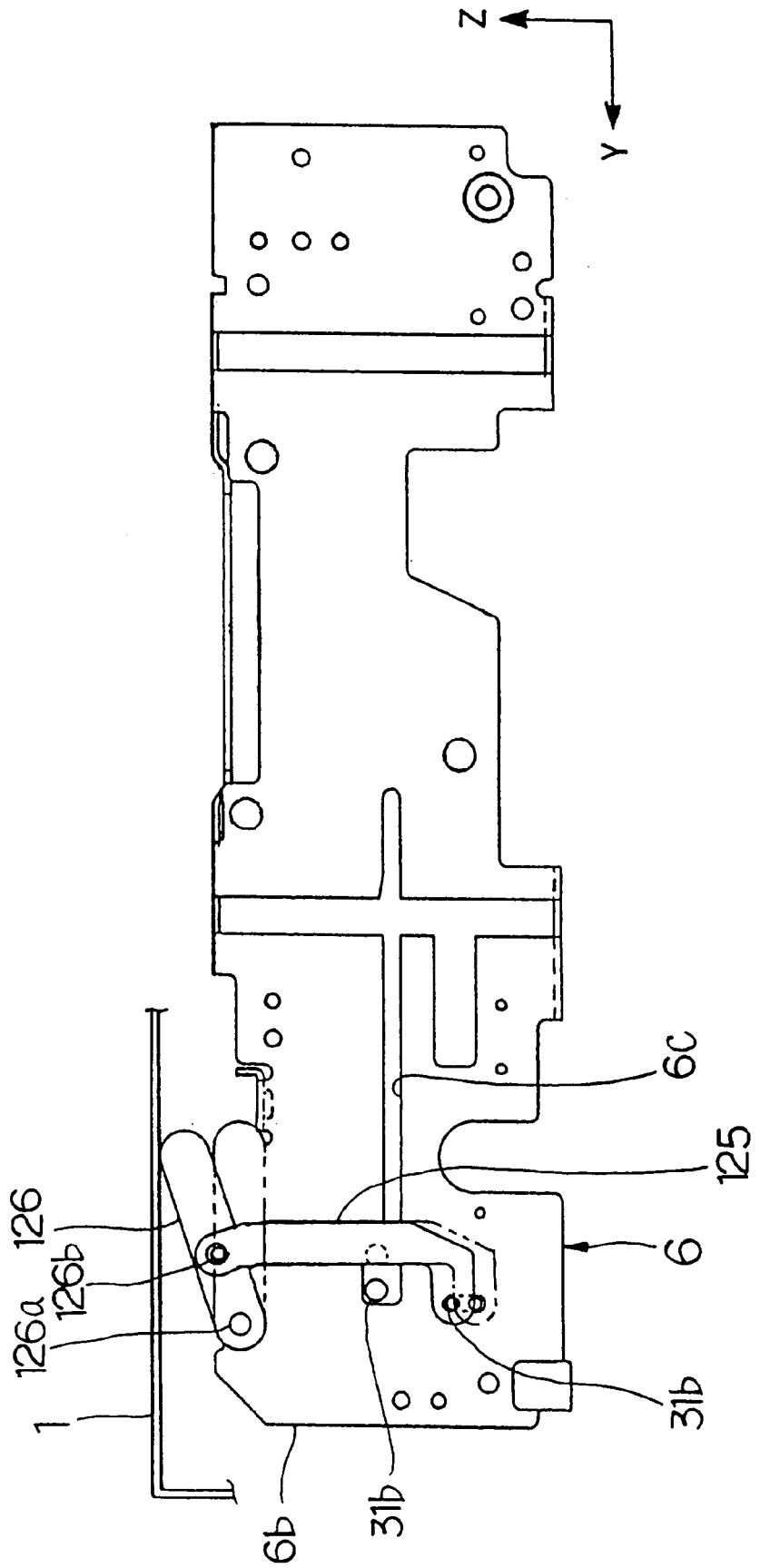
FIG. 60 is a right side view showing the locking means in the main unit of the apparatus according to the present invention.

As shown in FIG. 59 and FIG. 60, lock levers 124 and 126 for locking the main chassis 6 against the housing 1 when a disk is inserted or taken out through the disk insertion slot 5 are provided. Namely coupling levers 123, 125 each with a lower edge thereof coupled to a pin 31b of the carriage holding frame 31 so as to be rotatable extend substantially upward, and the upper edges thereof are coupled to coupling pins 124b, 126b of the lock levers 124, 126 fixed so as to be capable of swinging around supporting shafts 124a, 126a provided adjacent to the upper edges of the side faces 6a and 6b respectively. Then, when the carriage holding frame 31 is positioned in the lower side, the lock levers 124, 126 are set to stay substantially horizontal, but when the carriage holding frame 31 is positioned in the upper side namely the carriage 30 is held up at a specified height, the lock levers 124, 126 swing upward respectively to abut the internal surface of the top plate of the housing 1.

With this feature, especially the vertical movements of the main chassis, namely the main unit of the apparatus is restricted, so that the main unit of the apparatus can be prevented from its backlash when power to the apparatus is cut off, and when a disk is inserted or taken out through the disk insertion slot 5, each of the operations can easily and securely be performed.

It should be noted that a starting point or an end point of the various operational steps as described above is detected by using a detecting sensor (not shown in the figure) for detecting the timing thereof by means of contact or non-contact of the moving member with each corresponding component.

Next description is made for operations of the disk reproducing apparatus according to the embodiment of the present invention.

Figure 61:
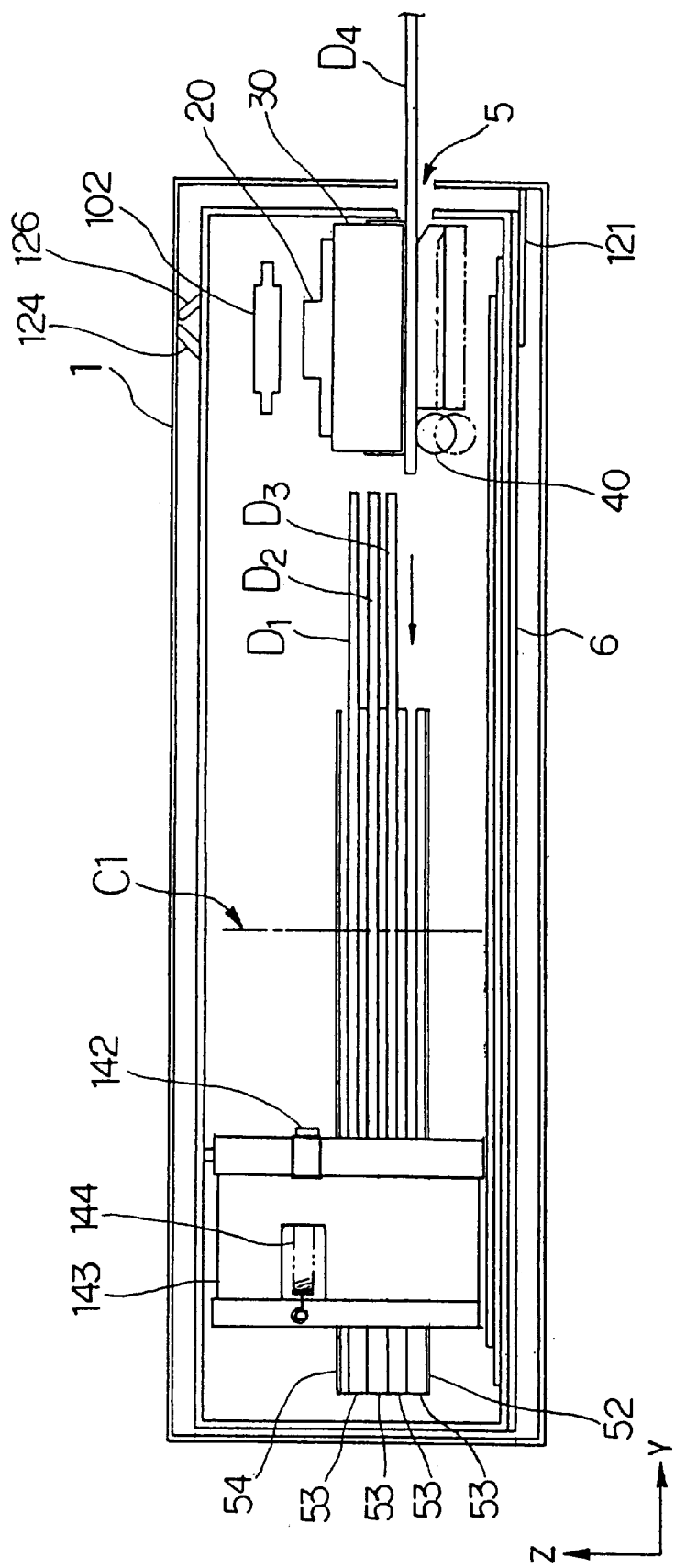
FIG. 61 is a side view showing a state in which a disk is going to be taken in one of trays in the apparatus according to the present invention.

At first, when power to the apparatus is cut off, as shown in FIG. 61, the carriage 30 is located at the stand-by position set at the specified height in the side of the disk insertion slot.

In this state, when the power is tuned ON and the disk insertion mode is specified, at first detection is made as to whether a disk is held on a tray or not. This detection is executed by making the moving up/down means serially select trays, making the disk take-out means move each tray to a specified position, making a photo-sensor provided at a specified position detect whether a disk is on the tray or not, and making the disk take-out means store again the tray back in the original position. All these operations are repeated for all trays.

Then, when any tray with no disk thereon has been detected through the above detection, the tray 53 with no disk thereon is positioned at a specified height (a height required for taking in or taking out a disk) by the moving up/down means 80. The cam gear 8 is rotated by a specified angle in the clockwise direction, the slide plate 151 of the cover driving means 150 moves forward, whereby the cover is opened, and the disk insertion slot 5 is opened. Then, the roller 40 rotates in the take-in direction, so that a disk is ready to be inserted. When a plurality of disks are inserted, disks may be inserted continuously or discretely for each instruction according to operations for a desired instruction.

It should be noted that FIG. 61 shows a state in which a disk D4 is going to be taken in one of the trays 53 which is in the lowest stage. In this disk taken-in state, the disk holding means 50 such as trays 53 is locked by the lock arm 143, while the main chassis 6 is locked against the housing 1 by the lock levers 121, 124 and 126, whereby the operation for taking in a disk can securely be performed.

When the operation for carrying in or out a carriage is finished, the operating mode shifts to the reproduction mode according to a specific instruction. At first, when the cam gear 8 is rotated in the counterclockwise direction by the driving means 70, the slide plate 151 is pulled in, the cover is closed, the lock arm 143 rotates in the counterclockwise direction to leave the disk holding means 50, so that the disk holding means can move up and down. Also, the carriage 30 moves down to a specified height, and the lock levers 124 and 126 also rotate downward to leave the housing 1. Then, when an operation for selecting a desired disk has been performed, any tray holding the disk thereon is positioned at the specified height (the height required for the disk reproduction) by the moving up/down means 80.

Then, the cam gear 8 is further rotated in the counterclockwise direction by the driving means 70. With the rotation of the cam gear 8, at first the slide plate 61 is moved rearward by means of action of the second cam groove 8b, and at the same time the levers 63, 64, and 66 each for separating a tray are moved in the longitudinal direction to separate a tray 53 holding a disk to be reproduced thereon from other trays.

Figure 62:
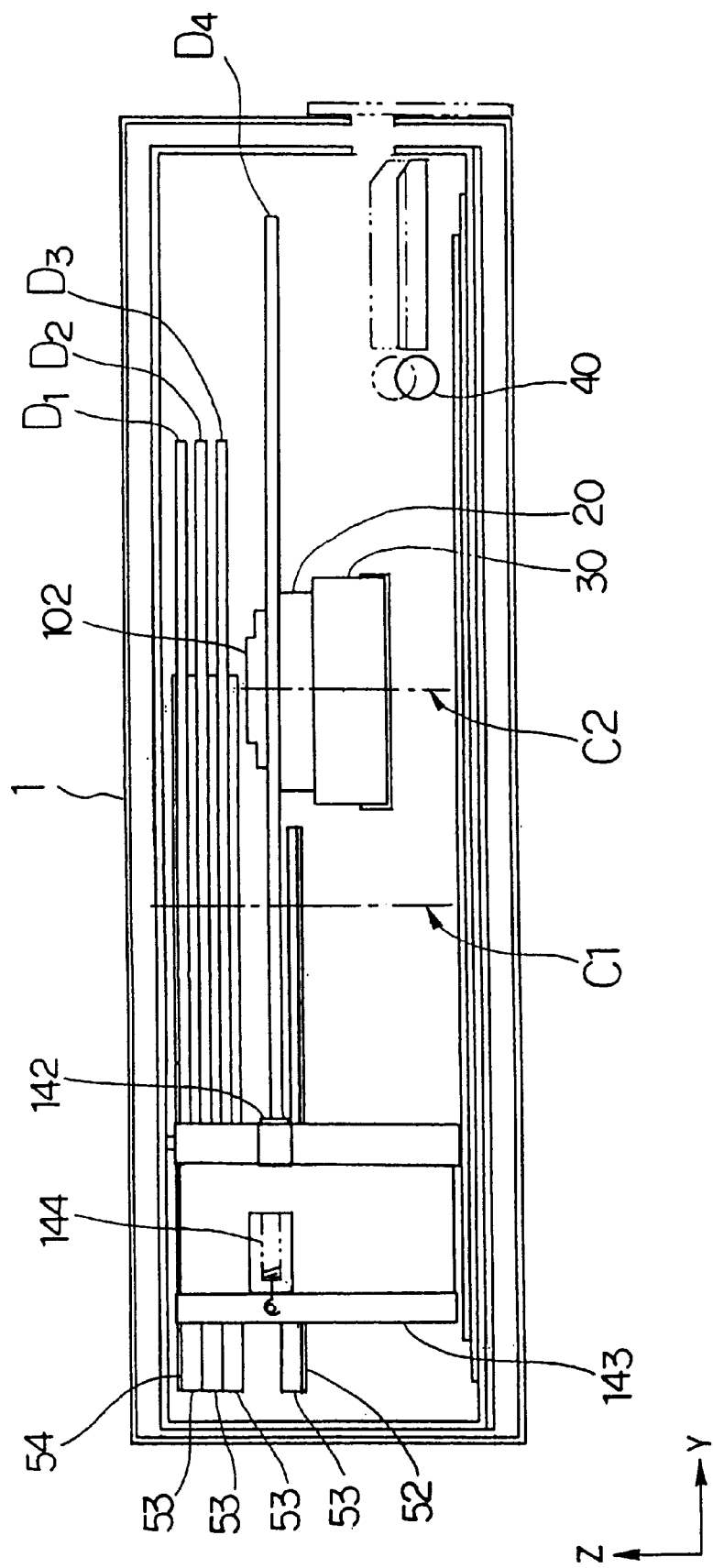
FIG. 62 is a side view showing a state in which the disk is reproduced in the apparatus according to the present invention.

When the cam gear 8 rotates further, the swing arm 37 is swung rearward by means of action of the first cam groove 8a, and at the same time the carriage 30 is moved from the stand-by position (the position shown in FIG. 61) to the reproducing position (C2 in the FIG. 62) between the trays. Locking due to the lock lever 121 is released in accordance with the rearward movement of the swing arm 37, and the main chassis 6 returns to the neutral position which is supported with vibration isolation.

Simultaneously when the carriage 30 moves to the reproducing position, the disk retrieve arm 142 rotates in the clockwise direction by means of action of the cam groove 8d to butt the rear section of the outer periphery of a disk to be reproduced, and this disk is moved from the stored position (C1 in FIG. 62) to the reproducing position. The forward movement of the disk is executed while it is guided by the guide piece 53e of the tray 53 and also against the resilient force of the disk returning arm 161, so that the center of the disk may not be displaced in the direction of X-axis, which allows transfer of a disk to be accurately performed with high precision. It should be noted that, with the rotation of the disk retrieve arm 142, the lock arm 143 also rotates in the clockwise direction to lock a tray 53 or the like at a specified position according to a resilient force of the spring 144. Backlash of the trays 53 or the like can be prevented by means of action due to the locking, so that transfer of a disk can accurately be performed with high precision.

Then, the carriage 30 reaches the reproducing position and the disk reaches the reproducing position, and at the same time the U-shaped engaging piece 32d on the carriage 30 engages the engaging pin 39d on the slide lever 39.

When the cam gear 8 rotates further, the slide lever 39 is moved by means of action of the third cam groove 8c in the direction opposite to the direction of X-axis, and at the same time the slide plate 32 shifts to move up the reproducing means holding frame 35, then the turn table 20 holds up and supports a selected disk from the lower side and at the same time clamps the disk in cooperation with the clamper 102.

Simultaneously when or with a slight delay after this clamping operation is executed, the disk returning arm 161 is slightly rotated in the clockwise direction by means of action of the tapered engaging piece 35*d* to leave the peripheral section of the disk, while the disk retrieve arm 142 is slightly rotated in the counterclockwise direction by means of action of the cam groove 8*d* also to leave the peripheral section of the disk.

As described above, when a disk is to be reproduced, the reproducing means and a disk to be reproduced are simultaneously moved so as to approach each other, so that a time required from generation of an instruction for disk reproduction until execution of reproduction can be reduced, which allows smooth reproduction to be achieved.

With this operation, a disk is ready to be reproduced and then the disk is reproduced. It should be noted that, when the reproduction of the disk is ended, the reproducing means is returned to the stand-by position, and the disk is returned to the original position to be stored, the processing is executed in the reverse order of the operations described above, so that description thereof is omitted herein.

When a disk stored in the disk holding means 50 is to be retrieved, if a predetermined disk retrieval mode is specified, any tray holding thereon the selected disk to be retrieved is positioned at a specified height by the moving up/down means, then the ejecting arm 94 is rotated by the driving means in the counterclockwise direction, and the ejecting arm 94 moves the disk forward by a specified distance. Then, the front edge section of the disk goes into a space between the roller 40 located in the position shown in FIG. 61 and rotating in the disk carrying out direction and the bottom surface of the carriage 30, and then the carry-out of the disk is ended by the rotating force of the roller 40.

As described above, with the disk reproducing apparatus according to the present invention, the size of the apparatus can be reduced, and at the same time, a time required from generation of an instruction for disk reproduction to execution of reproduction can be reduced, which allows smooth reproduction of a disk to be achieved.

Also, the transfer of a disk can be executed with the disk being securely held, which allows an improvement in the reliability of the apparatus's functions.

What is claimed is:

1. A disk reproducing apparatus comprising:

a disk holder for holding a plurality of disks in a disk holding position when said disks are not being reproduced, said disks being arrayed in said disk holder in a direction perpendicular to a main surface of each of the disks;

a disk reproducing unit which is transferrable between a non-reproducing position which is remote from said disk holding positions, and a reproducing position situated closer to said disk holding position than is said non-reproducing position, for reproducing a disk; and a disk retrieving and transferring unit for transferring a desired disk located at said disk holding position to and from said reproducing position;

wherein a transfer of the reproducing unit from said non-reproducing position to said reproducing position and a transfer of said desired disk from said disk holding position to said reproducing position are executed concurrently.

2. The disk reproducing apparatus according to claim 1, wherein:

said reproducing position is situated between said holding position and said non-reproducing position;

said disk reproducing unit is transferrable to said reproducing position from said non-reproducing position in a direction toward said holding position; and said disk retrieving and transferring unit transfers said desired disk from said holding position to said reproducing position in a direction toward said non-reproducing position.

3. The disk reproducing apparatus according to claim 1, wherein said disk reproducing unit comprises a pickup unit, a turntable and a clamper unit, all of which are collectively transferable between the non-reproducing position and the reproducing position.

4. A disk reproducing apparatus comprising:

a disk holder having a plurality of trays for holding each of a plurality disks in a disk holding position when said disks are not being reproduced, said disks being arrayed in a direction perpendicular to a main surface of each of the disks;

a disk reproducing unit which is transferrable between a non-reproducing position in which it does not overlap said disk holding position and a reproducing position for reproducing a disk wherein at least a portion of said disk reproducing unit overlaps said disk holding position;

a reproducing unit carrier mechanism for transferring said disk reproducing unit between said non-reproducing position and said reproducing position;

a disk selecting device for positioning a disk which is to be reproduced at a specified position so that said disk reproducing unit can enter said reproducing position when said disk is to be reproduced, and also for moving aside other disks in the direction in which said disks are arrayed; and a disk retrieving and transferring unit for transferring said disk which is to be reproduced to said reproducing position;

wherein, for reproducing a disk, a transfer of said disk reproducing unit from said non-reproducing position to said reproducing position and a transfer of said disk to be reproduced from said disk holding position to said reproducing position are executed concurrently.

5. A disk reproducing apparatus according to claim 4 further comprising:

a disk returning unit for returning a disk from said reproducing position to said disk holding position.

6. A disk reproducing apparatus according to claim 5, wherein said disk returning unit is disposed above said disk reproducing unit.

7. A disk reproducing apparatus according to claim 5, wherein said disk returning unit has a rotating member for returning which is capable of rotating in a direction parallel to a main surface of a disk at said reproducing position, and is also capable of engaging an outer peripheral section of the disk to move the disk, and a resilient member for forcing said rotating member for returning in a direction in which the disk is returned.

8. A disk reproducing apparatus according to claim 7, further comprising:

a disk holding unit for holding said rotating member for returning at a position away from an outer peripheral section of a disk against a resilient force of said resilient member when the disk is to be reproduced.

9. A disk reproducing apparatus according to to claim 4, wherein said disk retrieving and transferring unit has a rotating member for retrieval which is capable of rotating in a direction parallel to a main surface of a disk held on a tray, and also capable of removing and taking out a disk by engaging an outer peripheral section of the disk.

10. A disk reproducing apparatus according to claim 9 further comprising:

a locking member which locks said disk holder at a desired position.

11. A disk reproducing apparatus according to claim 10, wherein said locking member is operable in correlation to operation of said disk retrieving and transferring unit.

12. A disk reproducing apparatus according to claim 11, wherein said locking member has a lock arm which is rotatable in the same direction as a direction in which said rotating member for retrieval rotates and a resilient means for forcing said lock arm closer to said rotating member for retrieval.

13. A disk reproducing apparatus according to claim 4 further comprising:

a locking member which locks said disk holder at a desired position.

14. A disk reproducing apparatus according to claim 13, wherein said locking member is operable in correlation to operation of said disk retrieving and transferring unit.

15. The disk reproducing apparatus according to claim 4, wherein:

said reproducing position is situated between said holding position and said non-reproducing position;

said disk reproducing unit is transferrable to said reproducing position from said non-reproducing position in a direction toward said holding position; and said disk retrieving and transferring unit transfers a desired disk from said holding position to said reproducing position in a direction toward said non-reproducing position.

16. The disk reproducing apparatus according to claim 4, wherein said disk reproducing unit comprises a pickup unit, a turntable and a clamper unit, all of which are collectively transferable between the non-reproducing position and the reproducing position.

* * * * *